United States Patent
Kato et al.

(10) Patent No.: US 6,646,999 B1
(45) Date of Patent: Nov. 11, 2003

(54) MOBILE PACKET COMMUNICATION SYSTEM

(75) Inventors: Tsuguo Kato, Kawasaki (JP); Masaaki Wakamoto, Kawasaki (JP); Ryuichi Takechi, Kawasaki (JP); Hideaki Ono, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/482,712

(22) Filed: Jan. 13, 2000

(30) Foreign Application Priority Data

Feb. 19, 1999 (JP) .......................................... 11-041784

(51) Int. Cl.⁷ .............................. H04Q 7/20; H04Q 7/24
(52) U.S. Cl. .................... 370/329; 370/338; 370/389; 455/433; 455/450; 709/202
(58) Field of Search ................................ 370/329, 338, 370/349, 389, 400, 401; 455/422, 433, 445, 450, 507, 509, 517; 709/202, 249

(56) References Cited

U.S. PATENT DOCUMENTS

| | | | |
|---|---|---|---|
| 5,081,643 A | * | 1/1992 | Schilling .................... 375/130 |
| 5,841,769 A | * | 11/1998 | Okanoue et al. ............ 370/338 |
| 6,160,804 A | * | 12/2000 | Ahmed et al. ............... 370/349 |
| 6,424,818 B1 | * | 7/2002 | Hirono ....................... 455/11.1 |

* cited by examiner

Primary Examiner—Alpus H. Hsu
Assistant Examiner—Afsar M. Qureshi
(74) Attorney, Agent, or Firm—Katten Muchin Zavis Rosenman

(57) ABSTRACT

The present invention concerns a mobile packet communication system that supports data communications, including Internet communications, in a high-speed mobile communication system such as a cellular communication network, and integrates a mobile network and a fixed network on a common platform while providing the capability to select an optimum route. Location registration servers 1-4-1 to 1-4-3 each store in a one-to-one fashion the addresses of subscriber nodes 1-2-1 to 1-2-2 currently serving mobile terminals 1-1-1 to 1-1-2 each assigned a packet address, or store in a one-to-one fashion the addresses of gate nodes 1-3-1 to 1-3-2 connected to fixed equipment 1-5-1 to 1-5-2 each assigned a packet address, and a transmitting node, which is a subscriber node or a gate node, temporarily stores a receiving node address reported from the corresponding one of the location registration servers 1-4-1 to 1-4-3, and transfers subsequent packets directly to the receiving node by using the temporarily stored receiving node address.

8 Claims, 26 Drawing Sheets

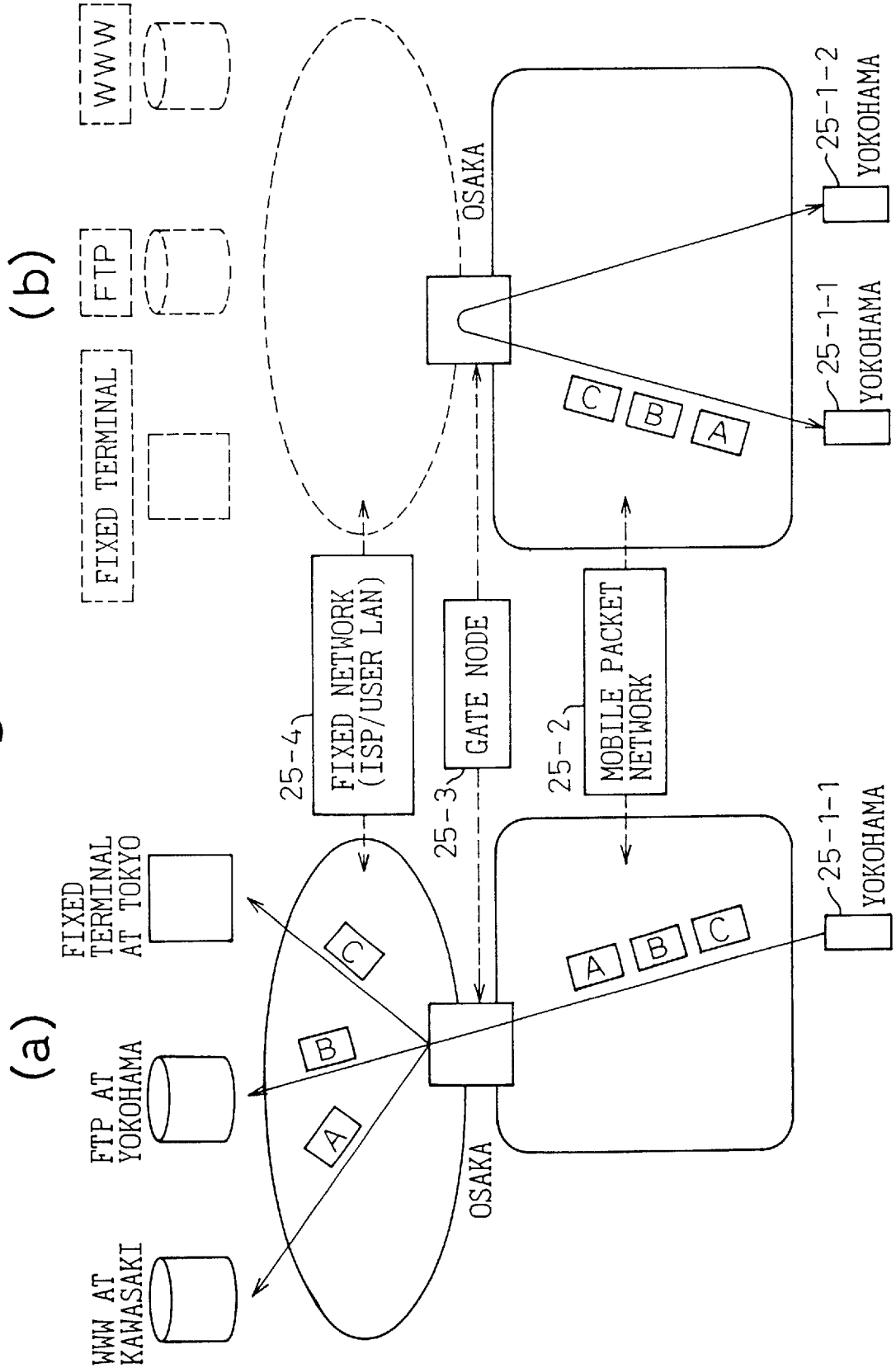

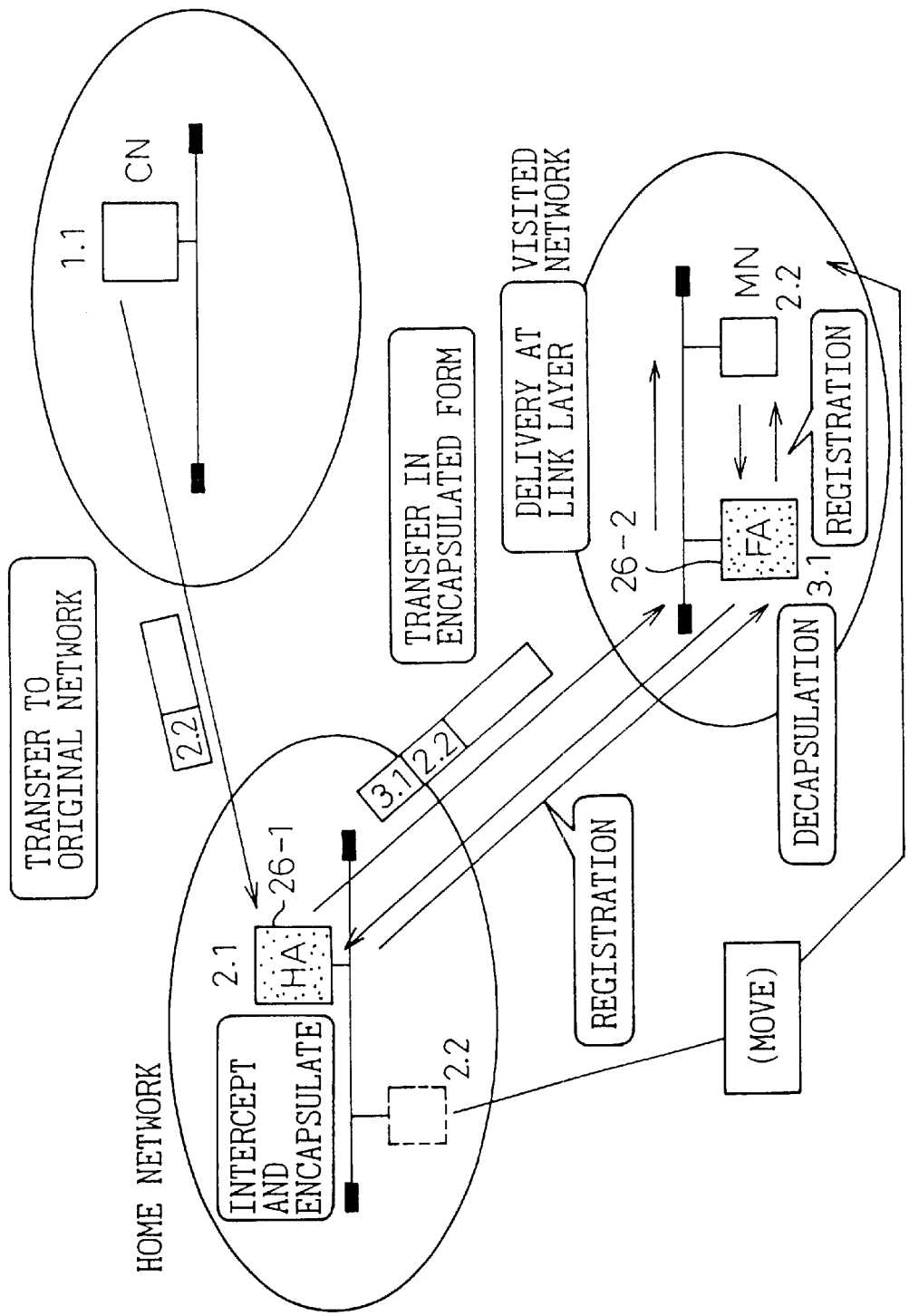

MOBILE PACKET COMMUNICATION SYSTEM

BACKGROUND OF THE INVENTION

1. Field of the Intention

The present invention relates to a mobile packet communication system that supports data communications, including Internet communications, in a high-speed mobile communication system such as a cellular communication network. Currently, studies on next generation mobile communication systems are proceeding in research institutes, standards bodies, and other organizations in various countries of the world, aiming to provide multimedia communication services, including high-speed data communications up to 2 Mbps, in the next generation of mobile communication systems.

Among others, packet communication services, including the Internet, are expected to displace the current mobile communication services intended primarily for voice communication and to become the core communication service in the next generation of mobile communication systems. Furthermore, studies have begun on communication networks that integrate mobile terminals connected to mobile radio communication networks and fixed equipment including Internet service providers (ISPS) and LANs within user premises.

2. Description of the Related Art

FIG. 20 is a diagram showing the configuration of a prior art mobile packet communication system in a cellular communication network. The mobile packet communication system comprises mobile terminals 20-1-1 to 20-1-2, subscriber nodes 20-2-1 to 20-2-3, gate nodes 20-3-1 to 20-3-2, and location registration servers 20-4-1 to 20-4-3, and is connected via the gate nodes 20-3-1 to 20-3-2 to fixed equipment 20-5-1 to 20-5-2, such as an Internet service provider (ISP) or a local area network (LAN) within user premises, connected to a fixed network.

The location registration servers 20-4-1 to 20-4-3 are provided, one for each group of terminal numbers (for example, E.164 addresses) having the same high-order digits and assigned to the mobile terminals 20-1-1 to 20-1-2, and each of the location registration servers 20-4-1 to 20-4-3 includes a location register 20-6. E. 164 is the international standard telephone numbering (terminal addressing) scheme defined by the ITU-T.

The location register 20-6 stores for each of the mobile terminals 20-1-1 to 20-1-2 the address [ADR6–8] of its current location (the subscriber node, 20-2-1 to 20-2-3, currently serving the mobile terminal) and the address [ADR4–5] of the gate node, 20-3-1 to 20-3-2, connected to the user LAN or the ISP to which the mobile terminal, 20-1-1 to 20-1-2, subscribes.

The subscriber nodes 20-2-1 to 20-2-3 and the gate nodes 20-3-1 to 20-3-2 each include a server search table 20-7 which is used to search for the addresses [ADR1 to ADR3] of the location registration servers 20-4-1 to 20-4-3 by reference to the high-order digits of the numbers of the mobile terminals 20-1-1 to 20-1-2.

Each of the gate nodes 20-3-1 to 20-3-2 further includes an address translation table 20-8 which is used to translate the address (IP address) contained in the header of a packet arriving from an external ISP or LAN into the number of a corresponding one of the mobile terminals 20-1-1 to 20-1-2.

FIG. 21 is a diagram for explaining the location registration operation for a moving mobile terminal in the prior art mobile packet communication system. In the figure, the configuration of the mobile packet communication system is the same as that shown in FIG. 20, and the same elements are designated by the same reference numerals. The location registration is performed in accordance with the following procedure consisting of steps (1) to (4)

(1) As the mobile terminal 20-1-1 moves into a new radio zone, it sends a location registration request to the subscriber node 20-2-1 in the new radio zone.

(2) Upon receiving the location registration request message from the mobile terminal 20-1-1, the subscriber node 20-2-1 searches the server search table 20-7 by reference to the high-order digit part [020] of the number [020-xxx1] of the mobile terminal 20-1-1, and retrieves the address [ADR1] of the corresponding location registration server.

(3) Location registration information (the address [ADR6] of the subscriber node 20-2-1) is transferred to the corresponding location registration server 20-4-1.

(4) The location registration server 20-4-1 updates the location register 20-6 based on the received location registration information.

FIG. 22 is a diagram for explaining the operation for packet transfer from the fixed equipment 20-5-2, such as an ISP or a user LAN, to the mobile terminal 20-1-1. In the figure, the configuration of the mobile packet communication system is the same as that shown in FIG. 20, and the same elements are designated by the same reference numerals. The packet transfer operation is performed in accordance with the following procedure consisting of steps (1) to (8).

(1) A packet containing the destination address [1.1.1] arrives at the gate node 20-3-2 from the fixed equipment 20-5-2 such as an ISP or a user LAN.

(2) The gate node 20-3-2 obtains the mobile terminal number [020-xxx1] from the destination address [1.1.1] by looking it up in the address translation table 20-8.

(3) Further, the gate node 20-3-2 searches the server search table 20-7 by reference to the mobile terminal number [020-xxx1] obtained in the above step, and retrieves the address [ADR1] of the corresponding location registration server 20-4-1.

(4) The gate node 20-3-2 requests the location registration server 20-4-1 of the address [ADR1] to send the location information concerning the designated mobile terminal.

(5) In response to the request, the location registration server 20-4-1 searches the location register 20-6 by reference to the number [020-xxx1] of the designated mobile terminal, and (6) returns the location information (subscriber node address=[ADR6]) concerning the designated mobile terminal to the gate node 20-3-2.

(7) The gate node 20-3-2 that received the location information appends the mobile terminal location information (subscriber node address=[ADR6]) to the packet received from the fixed equipment 20-5-2, and transfers the packet to the subscriber node 20-2-1.

(8) The subscriber node 20-2-1 designated by the subscriber node address=[ADR6] receives the packet, and transfers the packet to the destination mobile terminal 20-1-1 after removing the location information (subscriber node address) from the packet.

FIG. 23 is a diagram for explaining the operation for packet transfer from the mobile terminal 20-1-2 to the fixed equipment 20-5-1 such as an ISP or a user LAN. In the figure, the configuration of the mobile packet communication system is the same as that shown in FIG. 20, and the same elements are designated by the same reference numerals. The packet transfer operation is performed in accordance with the following procedure consisting of steps (1) to (7).

(1) The mobile terminal 20-1-2 sends a communication start request to the subscriber node 20-2-3.

(2) The subscriber node 20-2-3 that received the communication start request searches the server search table 20-7 by reference to the number [020-xxx2] of the mobile terminal that issued the communication start request, and retrieves the address [ADR1] of the corresponding location registration server.

(3) The subscriber node 20-2-3 requests the location registration server 20-4-1 of the address [ADR1] to send the address of the gate node, 20-3-1 to 20-3-2, connected to the user LAN or the ISP to which the originating mobile terminal 20-1-2 subscribes.

(4) In response to the request, the location registration server 20-4-1 retrieves the address [ADR4] of the corresponding gate node from the location register 20-6 by reference to the mobile terminal number [020-xxx2], and (5) returns the address [ADR4] of the corresponding gate node to the subscriber node 20-2-3.

(6) The subscriber node 20-2-3 that received the address [ADR4] of the corresponding gate node appends the address [ADR4] of the gate node 20-3-1 to the packet data received from the mobile terminal 20-1-2, and transfers the packet to the gate node 20-3-1.

(7) The gate node 20-3-1 designated by the gate node address=[ADR4] receives the packet, and transfers the packet to the fixed equipment 20-5-1 after removing the gate node address.

FIG. 24 is a diagram for explaining communication routes between the prior art mobile packet system and fixed equipment. Part (a) of the figure shows the packet communication routes from the mobile terminal to the fixed equipment, and part (b) shows the packet communication routes from the fixed equipment to the mobile terminal.

As shown in part (a) of the figure, all packets A, B, and C sent out from the mobile terminal 24-1 are routed through the mobile packet network 24-2, and are transferred together to the packet network (ISP/user LAN) in the fixed network 24-4, always passing through the gate node 24-3 predetermined for each mobile terminal. In the fixed network 24-4, the packets are individually routed and delivered to the respective destination processes such as a fixed terminal, FTP (File Transfer Protocol), WWW (World Wide Web), etc.

Likewise, as shown in part (b) of the figure, packets A, B, and C directed from the fixed network 24-4 to the mobile terminal 24-1 are delivered to the destination mobile terminal 24-1, always passing through the gate node 24-3 predetermined for each mobile terminal.

The prior art mobile packet communication system provides an access line between a mobile terminal and a specific ISP, user LAN, etc. in a fixed network, but the presence of a fixed network for routing individual packets is a prerequisite for the deployment of the system.

Accordingly, (1) there arises the problem that a common platform for integrating a mobile communication network and a fixed network cannot be constructed. At the present, it is common practice to construct the platforms separately, because of regulations that prohibit mobile communication service carriers operating fixed communication services and fixed communication service carriers operating mobile communication services), but in the future such regulations may be abolished.

In that case, a carrier wishing to support both mobile communication and fixed communication services would have to provide two platforms, one for the mobile communication service and the other for the fixed communication service, which would make administration operations complex and could pose a barrier to reducing the communication service costs.

Furthermore, (2) since communications must always be routed via a specified gate node between the mobile communication network and the fixed network, as earlier described, there can occur cases where the communication path has to be routed the long way around when the other party is actually located nearby, as shown in FIG. 25.

FIG. 25 is a diagram for explaining a roundabout communication route between the prior art mobile packet system and the fixed network. Part (a) of the figure shows a roundabout communication route for packet transfer from a mobile terminal to the fixed network, and part (b) shows a roundabout communication route for packet transfer between mobile terminals.

As shown in part (a) of FIG. 25, when a mobile terminal 25-1-1 located, for example, in Yokohama, sends out packets A, B, and C destined for destination processes, such as a fixed terminal, FTP, WWW, etc., located, for example, in Tokyo, Yokohama, and Kawasaki, via the mobile packet network 25-2 and fixed network 254, if the gate node 25-3 is, for example, in Osaka, the packets A, B, and C are always transferred through the gate node 25-3 in Osaka.

On the other hand, consider the situation where the mobile terminal 25-1-1 located, for example, in Yokohama sends out packets A, B, and C destined for another mobile terminal 25-1-2 also located in Yokohama, as shown in part (b) of FIG. 25; in this case also, the packets A, B, and C are transferred through the gate node 25-3 in Osaka.

This not only increases packet transfer delay time and degrades the quality of communication service, but also increases network traffic loads and adversely affects the quality of other communications.

Currently, the European Telecommunications Standard Institute (ETSI) is working toward the standardization of a mobile packet communication system (GPRS), but the basic system configuration is the same as that described: above and, therefore, involves similar problems.

On the other hand, the Mobile-IP based mobile packet communication system that the Internet Engineering Task Force (IETF), the Internet standards board, has been studying is known as a mechanism that will support mobile communication services with minimum changes to the existing Internet mechanism.

FIG. 26 is a diagram for explaining the Mobile-IP based mobile packet communication system. In the Internet, a domain is defined for each geographically closed area (for example, within an office). An IP packet is routed to the domain based on its IP address, and from there, the packet is delivered to the end terminal based on a link layer address such as a MAC (Media Access Control) address on an Ethernet bus.

In Mobile-IP, a home agent HA 26-1 and a foreign agent FA 26-2 are defined for each domain. It is assumed that each terminal is usually located within a specific domain (home network).

When a mobile terminal MN (Mobile Node) of address [2.2] moves into another domain (visited network), the visited network transmits via its foreign agent FA the IP address (care-of address: in this example, [3.1]) of the foreign agent FA residing in the visited network to the home agent HA residing in the home network.

Any packet destined for the mobile terminal MN of address [2.2] is first intercepted by the home agent HA in the home network. The home agent HA appends the IP address [3.1] of the foreign agent residing in the network in which the mobile terminal MN is currently located, and the packet is encapsulated for transmission to the visited network. This eliminates the need for IP address allocation for the mobile terminal MN.

The foreign agent FA decapsulates the packet by removing the appended IP address of the foreign agent FA, and delivers the packet to the mobile terminal MN based on the link layer address. (MAC address, etc.). On the other hand, any packet sent out from the mobile terminal MN is transferred directly from the visited network in accordance with the usual Internet rules.

Since Mobile-IP is based on Internet communications in existing fixed networks, as earlier noted, it is possible to integrate mobile communication networks with fixed networks. However, since communications are always routed via the home network, the previously described problem (2) remains to be solved.

Furthermore, though details will not be described here, Mobile-IP involves the widely recognized problem that it cannot be extended to high-speed mobile applications such as portable telephone systems, because it does not take account of high-speed mobility in the first place.

As described, with the prior art mobile packet communication system, it has not been possible to construct a common platform integrating packet transfers between a mobile terminal and fixed equipment while providing the capability to select an optimum route

SUMMARY OF THE INVENTION

The present invention is aimed at resolving the above-outlined problems, and an object of the invention is to provide a mobile packet communication system that can integrate packet transfers between a mobile terminal and fixed equipment on a common platform while providing the capability to select an optimum route.

The mobile packet communication system of the present invention (1) comprises mobile terminals connected via a mobile radio communication network, subscriber nodes accommodating the mobile terminals, gate nodes connected to fixed equipment including Internet service providers or local area networks, and a plurality of location registration servers, one for each group of destination packet addresses having the same high-order digits, wherein the subscriber nodes, the gate nodes, and the location registration servers are interconnected by a network, and wherein:

the subscriber nodes, the gate nodes, and the location registration servers are each assigned a unique address for routing; the location registration servers each include a register which stores, for each mobile terminal assigned a packet address containing the high-order digit of packet destination address associated with the location registration server, the address of the subscriber node currently serving the mobile terminal, or stores, for each fixed equipment assigned a packet address containing the high-order digit, the address of the gate node to which the fixed equipment is connected; the subscriber nodes and the gate nodes each include a table used to retrieve the address of the corresponding location registration server by reference to the high-order digit of the packet destination address; a transmitting node, which is a subscriber node that received a packet from a particular mobile terminal or a gate node that received a packet from particular fixed equipment, includes means for retrieving the address of the corresponding location registration server from the high-order digit of the destination address contained in the packet, and for transferring the received packet to the location registration server; the location registration server includes means for retrieving, by reference to the destination address contained in the received packet, the address of the mobile terminal corresponding to the destination address or the address of a receiving gate node connected to the fixed equipment corresponding to the destination address, and for returning the retrieved receiving node address to the transmitting node; and the transmitting node includes means for temporarily storing the receiving node address returned from the location registration server, and for transferring any subsequent packet having the same destination address and received from the mobile terminal or the fixed equipment, directly to the receiving node by using the temporarily stored receiving node address.

(2) The location registration server includes means for transferring the packet received from the transmitting node on to the receiving node, and the transmitting node includes means for transferring directly to the receiving node any n-th packet (n≧2) having the same destination address and received from the mobile terminal or the fixed equipment subsequently to the reception of the receiving node address from the location registration server.

(3) The subscriber nodes, the gate nodes, and the location registration servers are each assigned a unique Internet address for routing, and the network interconnecting the subscriber nodes, the gate nodes, and the location registration servers is constructed from a router network.

(4) The subscriber nodes, the gate nodes, and the location registration servers are each assigned a unique ATM address for routing, and the network interconnecting the subscriber nodes, the gate nodes, and the location registration servers is constructed using semi-permanent connections on an ATM network, wherein the subscriber nodes, the gate nodes, and the location registration servers each include means for transferring the packet by using adaptation layer AAL Type 5 protocol.

(5) The subscriber nodes, the gate nodes, and the location registration servers are each assigned a unique ATM address for routing, and the network interconnecting the subscriber nodes, the gate nodes, and the location registration servers is constructed using semi-permanent connections on an ATM network, wherein the subscriber nodes, the gate nodes, and the location registration servers each include means for transferring the packet by using adaptation layer AAL Type 2 protocol.

(6) The subscriber nodes, the gate nodes, and the location registration servers are each assigned a unique address of adaptation layer AAL Type 2 for routing, and the network interconnecting the subscriber nodes, the gate nodes, and the location registration servers is constructed using semi-permanent connections of adaptation layer AAL Type 2 on an ATM network, wherein the subscriber nodes, the gate nodes, and the location registration servers each include means for transferring the packet by using adaptation layer AAL Type 2 protocol.

(7) The subscriber nodes, the gate nodes, and the location registration servers are each assigned a unique ATM connectionless address for routing, and the network interconnecting the subscriber nodes, the gate nodes, and the location registration servers is constructed from an ATM connectionless network, wherein the subscriber nodes, the gate nodes, and the location registration servers each include means for transferring the packet by using adaptation layer AAL Type 5 protocol or adaptation layer AAL Type 2 protocol.

(8) The subscriber nodes, the gate nodes, and the location registration servers are interconnected by switched virtual connections (SVCS) on an ATM network.

BRIEF DESCRIPTION OF THE DRAWINGS

The present invention will be more clearly understood from the description as set forth below with reference to the accompanying drawings.

FIG. 25 is a diagram for explaining a roundabout communication route between the prior art mobile packet system and fixed equipment.

FIG. 26 is a diagram for explaining a Mobile-IP based mobile packet communication system.

DESCRIPTION OF THE PREFERRED EMBODIMENTS

Figure 1:
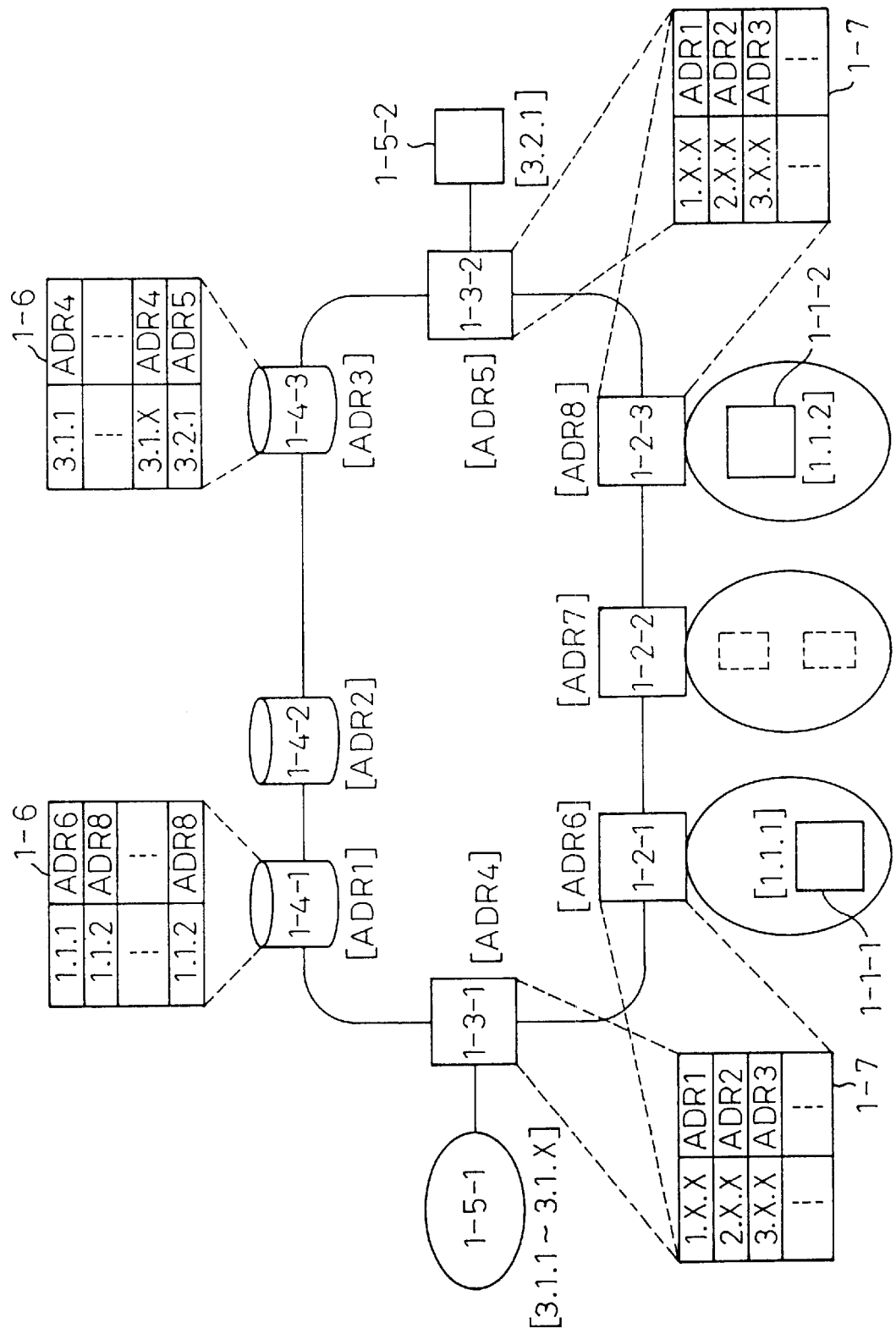
FIG. 1 is a diagram showing the system configuration of a mobile packet communication system according to the present invention.

FIG. 1 is a diagram showing the system configuration of a mobile packet communication system according to the present invention. The mobile packet communication system comprises: mobile terminals 1-1-1 to 1-1-2 connected to a mobile radio communication network; subscriber nodes 1-2-1 to 1-2-3 accommodating the mobile terminals 1-1-1 to 1-1-2; gate nodes 1-3-1 to 1-3-2 connected to fixed equipment; and location registration servers 1-4-1 to 1-4-3 which register the locations of the mobile terminals 1-1-1 to 1-1-2.

The mobile terminals 1-1-1 to 1-1-2 are connected via the gate nodes 1-3-1 to 1-3-2 to the fixed equipment 1-5-1 to 1-5-2 such as Internet service providers (ISPS) or LANS within user premises.

The location registration servers 1-4-1 to 1-4-3 are provided as one for each group of packet destination addresses (hereinafter referred to as the packet addresses) having the same high-order digits but not for each group of mobile terminal numbers having the same high-order digits. Internet addresses (IP addresses) defined by IPv4 or IPv6, for example, can be used as the packet addresses.

IPv4 and IPv6 (Internet Protocol Versions 4 and 6) are Internet protocol standard specifications revised primarily for the purposes of expanding the address space and easing the routing load.

It is assumed here that packet addresses [1.1.1] and [1.1.2] such as IP addresses are assigned to the mobile terminals 1-1-1 to 1-1-2, while packet addresses [3.1.1 to 3.1.x] and [3.2.1] are assigned to the fixed equipment 1-5-1 to 1-5-2 such as Internet service providers (ISPS) or user LANS.

The location registration servers 1-4-1 to 1-4-3 are each provided with a location register 1–6 which stores, for each mobile terminal packet address, the current location of the corresponding mobile terminal (i.e., the address [ADR6–8] of the subscriber node currently serving the mobile terminal), or stores for each fixed equipment packet address the address [ADR4–5] of the gate node connected to the corresponding fixed equipment such as an Internet service provider or a user LAN.

Each of the location registration servers 1-4-1 to 1-4-3 further includes the function of transferring a packet to the destination address based on the subscriber node address or the gate node address stored in the location register 1-6.

The subscriber nodes 1-2-1 to 1-2-3 and the gate nodes 1-3-1 to 1-3-2 each include a server search table 1-7 which is used to search for the addresses [ADR1 to ADR3] of the location registration servers by reference to the high-order digits of the packet addresses assigned to the mobile terminals 1-1-1 to 1-1-2, not the numbers of the mobile terminals 1-1-1 to 1-1-2.

Figure 2:
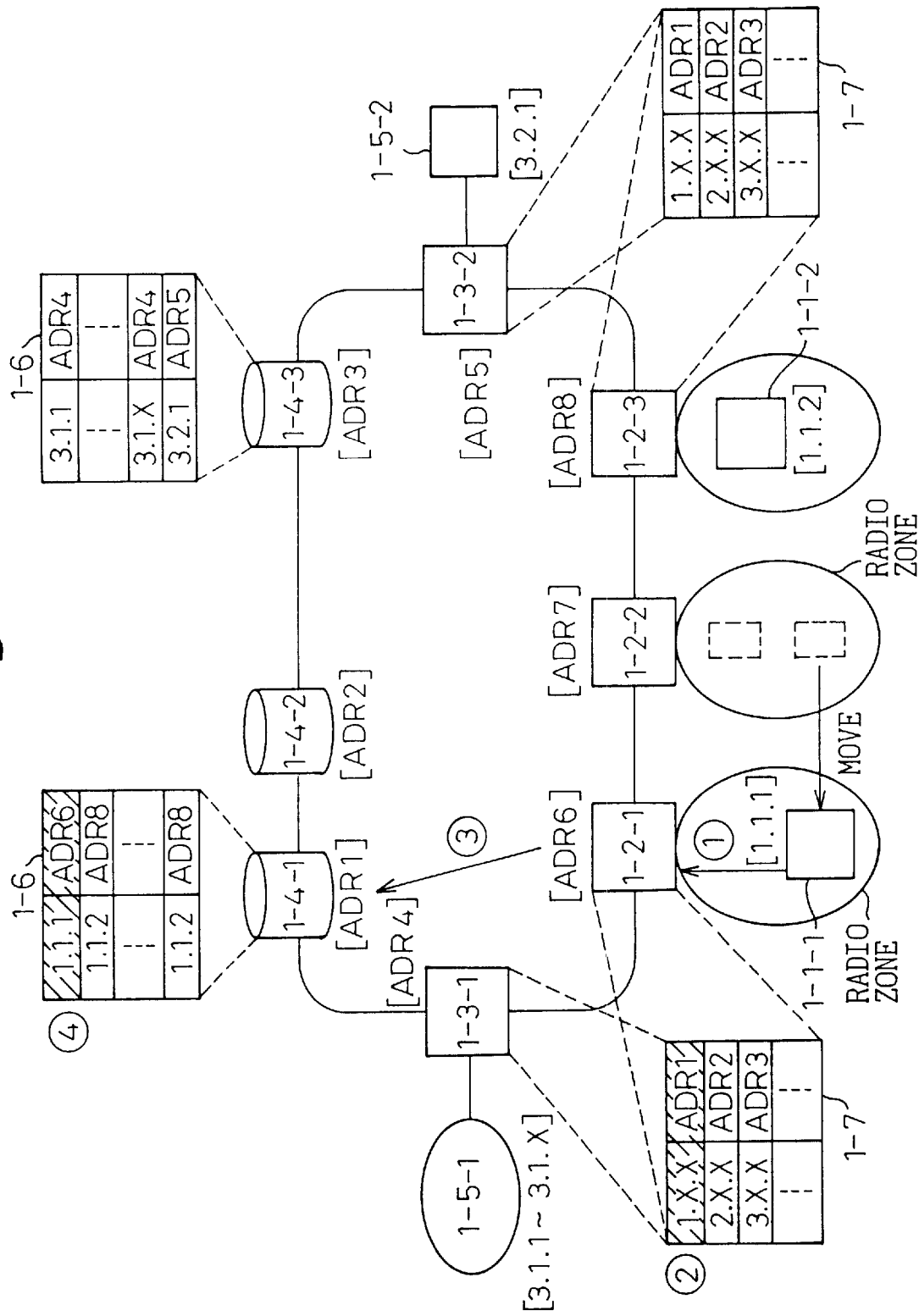
FIG. 2 is a diagram for explaining the location registration operation of a mobile terminal according to the present invention.

FIG. 2 is a diagram for explaining the location registration operation of a mobile terminal according to the present invention. In the figure, the configuration of the mobile packet communication system is the same as that shown in FIG. 1, and the same elements are designated by the same reference numerals. The mobile terminal location registration operation is performed in accordance with the following procedure consisting of steps (1) to (4)

(1) As the mobile terminal 1-1-1 moves into a new radio zone, it sends a location registration request to the subscriber node 1-2-1 in the new radio zone.

(2) Upon receiving the location registration request message from the mobile terminal 1-1-1, the subscriber node 1-2-1 searches the server search table 1–7 by reference to the high-order digit part [1.X.X] of the packet address [1.1.1] assigned to the mobile terminal 1-1-1, and retrieves the address [ADR1] of the corresponding location registration server. Here, X denotes an arbitrary number.

(3) The subscriber node 1-2-1 transfers location registration information (the address [ADR6] of the subscriber node 1-2-1) to the location registration server 1-4-1 corresponding to the address [ADR1].

(4) The location registration server 1-4-1 updates the location register 1–6 based on the received location registration information.

Figure 3:
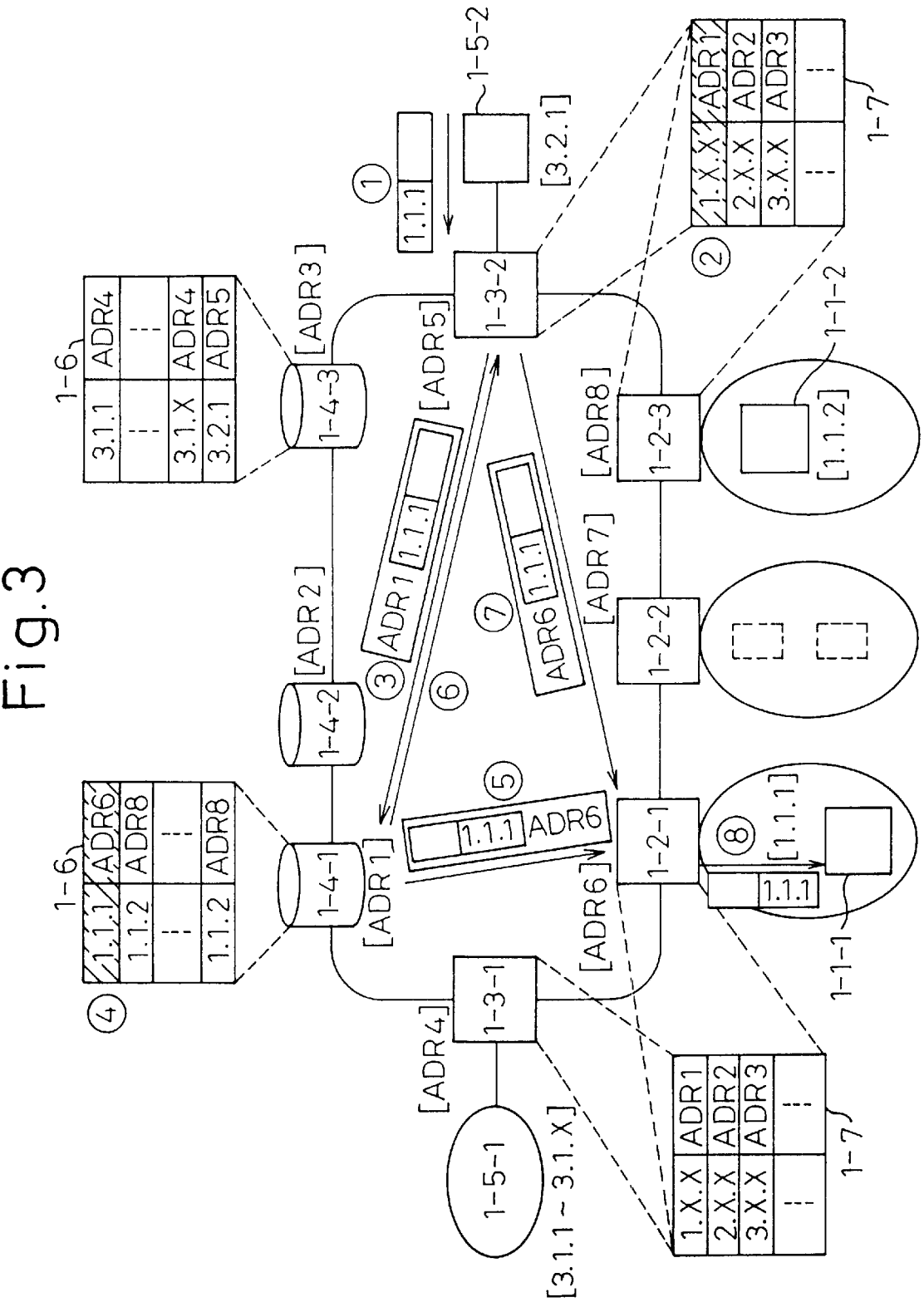
FIG. 3 is a diagram for explaining the operation for packet transfer from fixed equipment to a mobile terminal according to the present invention.

FIG. 3 is a diagram for explaining the operation for packet transfer from the fixed equipment side to the mobile terminal according to the present invention. In the figure, the configuration of the mobile packet communication system is the same as that shown in FIG. 1, and the same elements are designated by the same reference numerals.

Packet transfer from the fixed equipment 1-5-2 side, to which an Internet service provider or a user LAN is connected, to the mobile terminal 1-1-1 is performed in accordance with the following procedure consisting of steps (1) to (8).

(1) A packet containing the destination address [1.1.1] arrives at the gate node 1-3-2 from the fixed equipment 1-5-2 side to which an Internet service provider or a user LAN is connected.

(2) The gate node 1-3-2 searches the server search table 1–7 by reference to the high-order digit part [1.X.X] of the packet address [1.1.1], and retrieves the address [ADR1] of the corresponding location registration server.

(3) The gate node 1-3-2 appends the address [ADR1] of the location registration server to the received packet, and transfers the packet to the corresponding location registration server 1-4-1.

(4) The location registration server 1-4-1 that received the packet queries the location register 1–6 by reference to the destination packet address [1.1.1], and retrieves the address [ADR6] of the subscriber node serving the destination mobile terminal.

(5) The location registration server 1-4-1 appends the mobile terminal location information (subscriber node address=[ADR6]) to the received packet, and transfers the packet to the subscriber node 1-2-1 corresponding to the address [ADR6].

(6) Further, the location registration server 1-4-1 sends the retrieved mobile terminal location information (subscriber node address=[ADR6]) to the gate node 1-3-2.

(7) The gate node 1-3-2 caches (temporarily stores) the received location information (subscriber node address=[ADR6]), and for each subsequent packet arriving from the fixed equipment 1-5-2, the gate node 1-3-2 reads out the cached location information (subscriber node address=[ADR6]), appends it to the packet, and transfers the packet directly to the subscriber node 1-2-1.

(8) The subscriber node 1-2-1 that received the packet from the location registration server 1-4-1 or the gate node 1-3-2 removes the location information (subscriber node address=[ADR6]) and transfers the packet to the mobile terminal 1-1-1.

Figure 4:
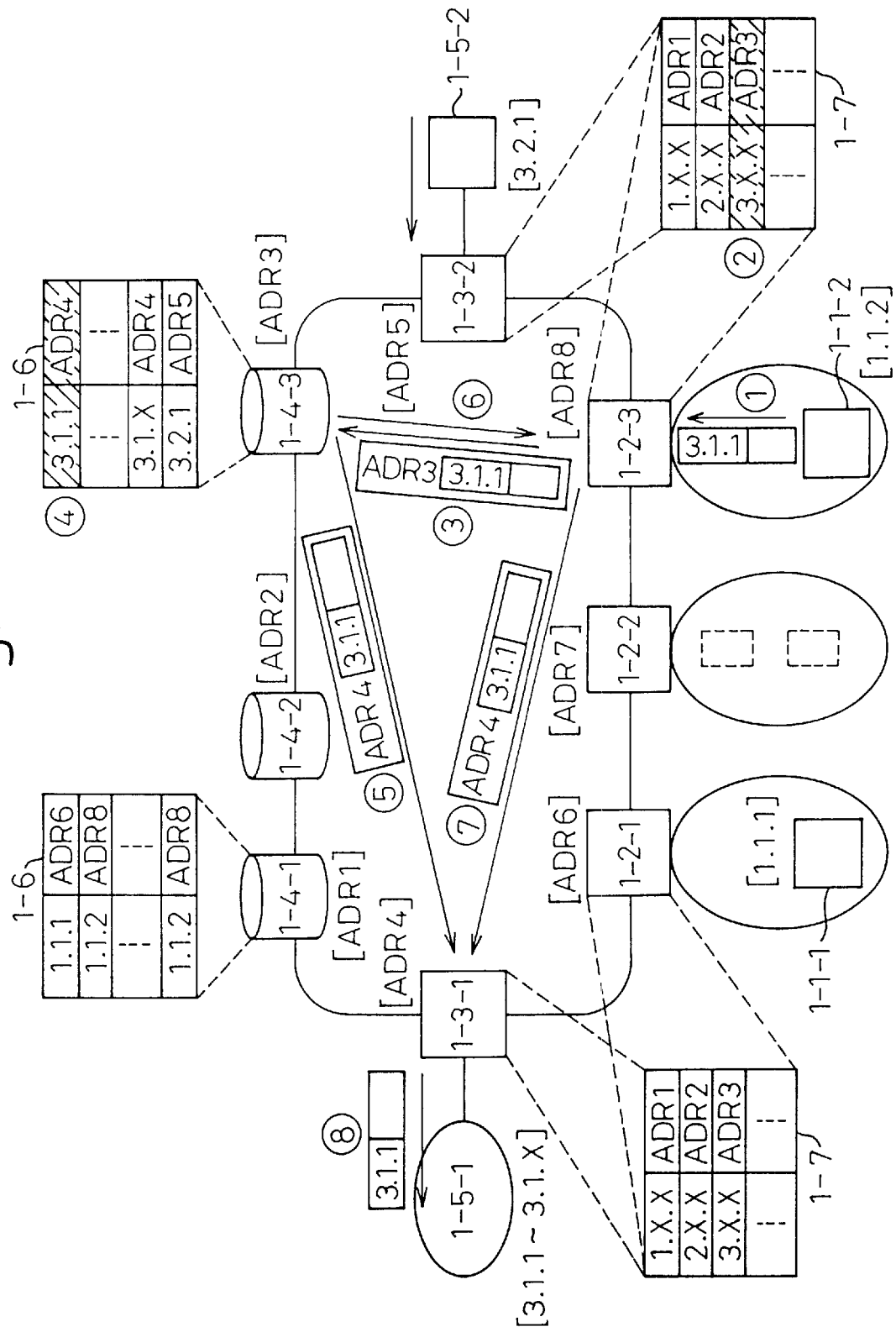
FIG. 4 is a diagram for explaining the operation for packet transfer from a mobile terminal to fixed equipment according to the present invention.

FIG. 4 is a diagram for explaining the operation for packet transfer from the mobile terminal to the fixed equipment side according to the present invention. In the figure, the configuration of the mobile packet communication system is the same as that shown in FIG. 1, and the same elements are designated by the same reference numerals.

Packet transfer from the mobile terminal 1-1-2 to the fixed equipment 1-5-1 side, to which an Internet service provider or a user LAN is connected, is performed in accordance with the following procedure consisting of steps (1) to (8).

(1) A packet containing the destination packet address [3.1.1] arrives at the subscriber node 1-2-3 from the mobile terminal 1-1-2.

(2) The subscriber node 1-2-3 searches the server search table 1–7 by reference to the high-order digit part [3.X.X] of the destination packet address [3.1.1], and retrieves the address [ADR3] of the corresponding location registration server.

(3) The subscriber node 1-2-3 appends the address [ADR3] of the location registration server to the received packet, and transfers the packet to the location registration server 1-4-3 corresponding to the address [ADR3].

(4) The location registration server 1-4-3 that received the packet queries the location register 1–6 by reference to the packet address [3.1.1], and retrieves the address [ADR4] of the destination gate node.

(5) The location registration server 1-4-3 appends the destination information (gate node address=[ADR4]) to the received packet, and transfers the packet to the gate node 1-3-1 corresponding to the address [ADR4].

(6) Further, the location registration server 1-4-3 sends the retrieved destination information (gate node address=[ADR4]) to the subscriber node 1-2-3.

(7) The subscriber node 1-2-3 caches the received destination information (gate node address=[ADR4]) and, for each subsequent packet arriving from the mobile terminal 1-1-2, the subscriber node 1-2-3 reads out the cached destination information (gate node address=[ADR4]), appends it to the packet, and transfers the packet directly to the gate node 1-3-1. (8) The gate node 1-3-1 that received the packet from the location registration server 1-4-3 or the subscriber node 1-2-3 removes the destination information (gate node address=[ADR4]) and transfers the packet to the fixed equipment 1-5-1.

In this way, packet transfers from the fixed equipment to the mobile terminal and from the mobile terminal to the fixed equipment can both be accomplished in accordance with the same operation procedure and based on the packet addresses of the same addressing scheme.

The packet addresses of the same addressing scheme are treated in the same manner between the mobile terminal and the fixed equipment, the only difference being that the location registration procedure necessary for the mobile terminal is not needed for the fixed equipment (the initial value is used).

In other words, the same operation procedure can be used for packet transfer between mobile terminals or between each fixed equipment. That is, according to the configuration and transfer operations of the invention shown in FIGS. 1 to 4, though the first packet has to be routed through the designated location registration server, the subsequent packets can be transferred along the optimum shortest route directly to the subscriber node or the gate node, and the mobile terminal and the fixed equipment can be connected on a common platform.

The optimum route to the subscriber node or the gate node can be easily selected by making changes to the location register 1–6. In the packet transfer procedures shown in FIGS. 3 and 4, the first packet is transferred to the destination node via the location registration server, and the second and subsequent packets are transferred from the subscriber node or the gate node directly to the destination node; alternatively, the location registration server may not be provided with the function of transferring a packet to the destination node, and instead, the subscriber node or the gate node may be configured to start transferring the packets, including the first packet, directly to the destination node after receiving the address of the destination node from the location registration server.

Figure 5:
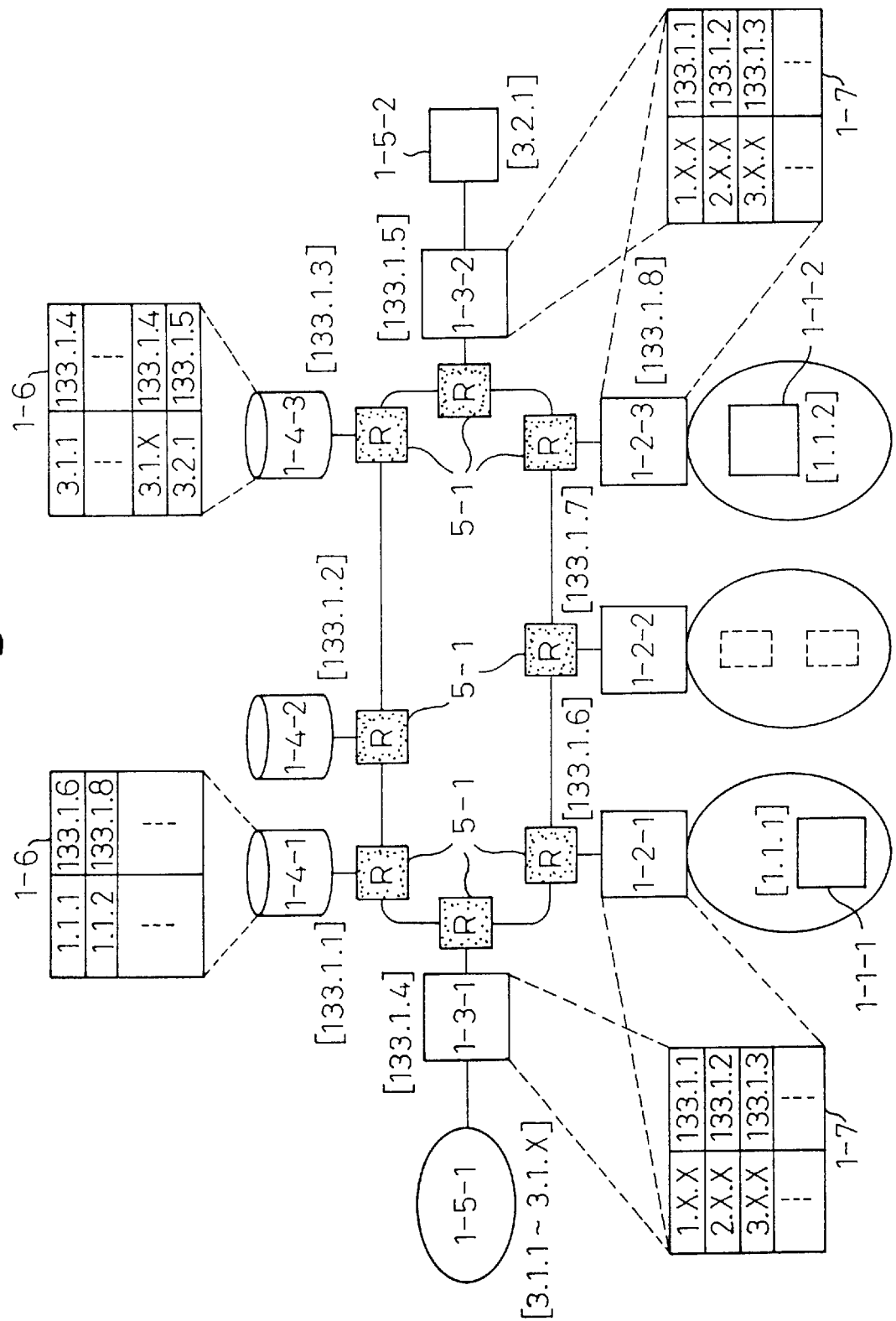
FIG. 5 is a diagram showing the configuration of an embodiment of the present invention that uses an IP network (router network).

FIG. 5 is a diagram showing the configuration of an embodiment of the present invention that uses an IP network (router network) as the internode network. In this configuration, the address of each node is an IP (Internet Protocol) address.

In the embodiment using the IP network shown in FIG. 5, node-specific IP addresses [133.1.1] to [133.1.8] are assigned as the addresses [ADR1]to [ADR8] of the nodes in the mobile packet communication system shown in FIG. 1, and the nodes are interconnected by routers 5-1. In FIG. 5, the same elements as those shown in FIG. 1 are designated by the same reference numerals.

In the embodiment of FIG. 5, the location registration and packet transfer operations are performed in accordance with the same operation procedures shown in FIGS. 2 to 4, using the node-specific IP addresses [133.1.1] to [133.1.8] as the addresses [ADR1] to [ADR8] of the respective nodes.

Figure 6:
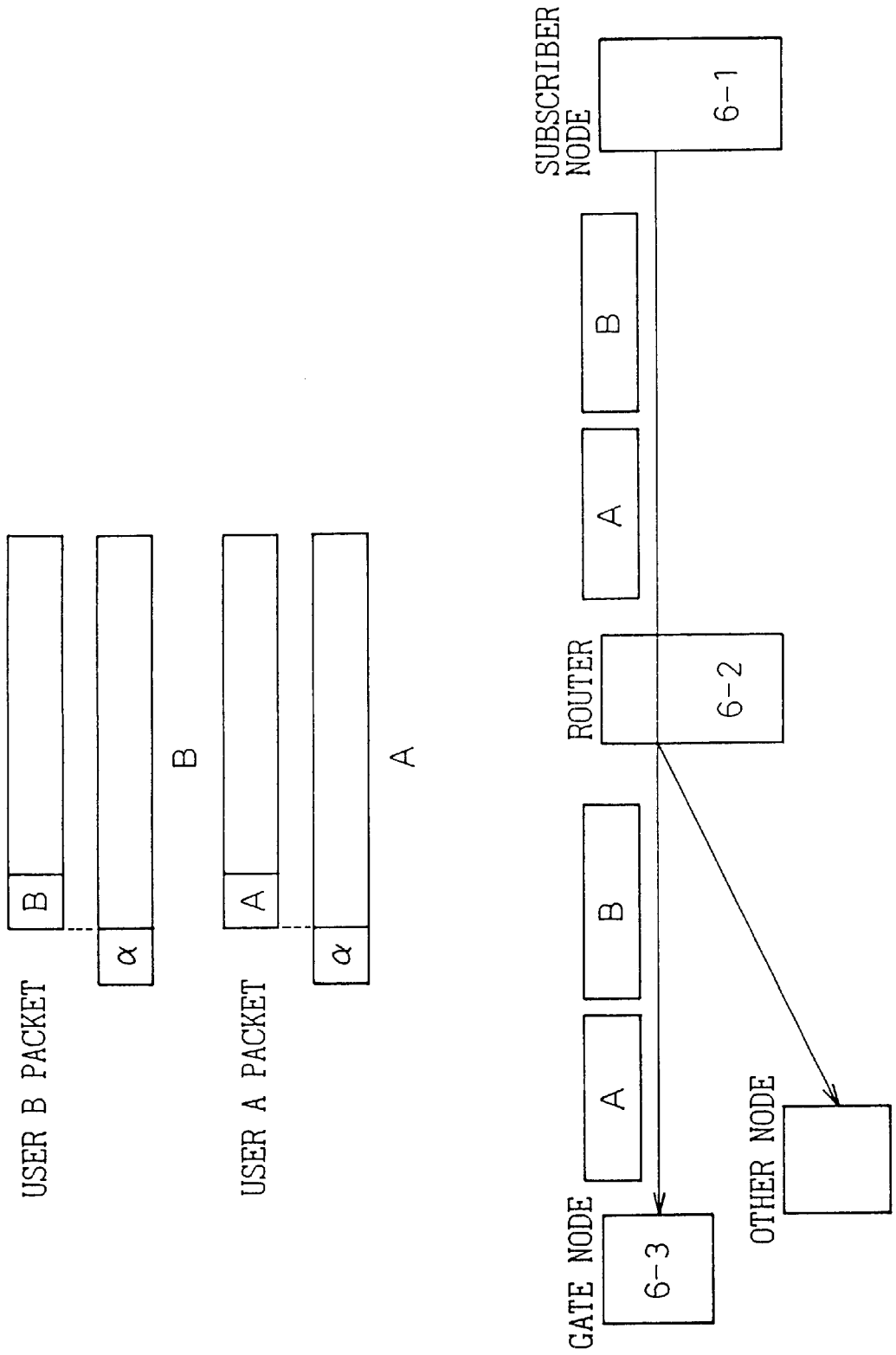
FIG. 6 is a diagram for explaining packet transfer in the embodiment of the present invention using the IP network (router network).

FIG. 6 is a diagram for explaining node-to-node packet transfer in the embodiment of the present invention using the IP network shown in FIG. 5.

The subscriber node 6-1 sends out a packet A and a packet B after appending the IP address [α] of the destination gate node to a user A packet and a user B packet, respectively.

The intermediate router 6-2 refers to the IP address [α] and transfers each packet to the destination node. In the example shown in FIG. 6, the packets A and B are both transferred to the gate node 6-3.

Figure 7:
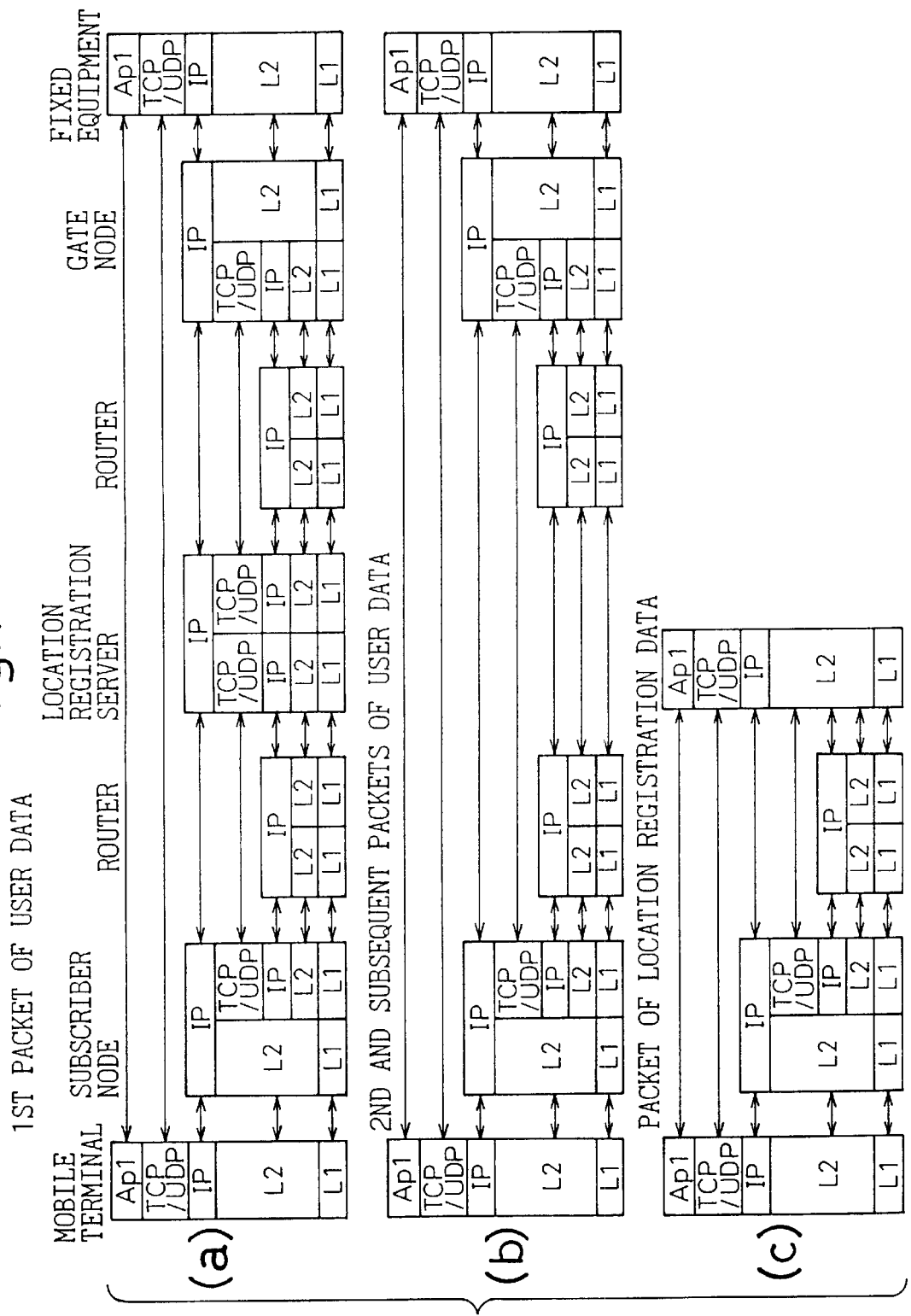
FIG. 7 is a diagram showing protocol stacks in the embodiment of the present invention that uses the IP network (router network).

FIG. 7 shows protocol stacks in the embodiment of the present invention that uses the IP network shown in FIG. 5. Part (a) of the figure shows the protocol stacks for the transfer of the first user data packet, (b) the protocol stacks for the transfer of the second and subsequent user data packets, and (c) the protocol stacks for the transfer of a location registration data packet.

As shown in part (a) of the figure, the first packet is terminated at the location registration server for transfer, but the second and subsequent packets are transferred directly to the subscriber node or the gate node through the intermediate routers. Packet transfers to and from each node, the location registration server, and the routers are performed based on the IP address.

Figure 8:
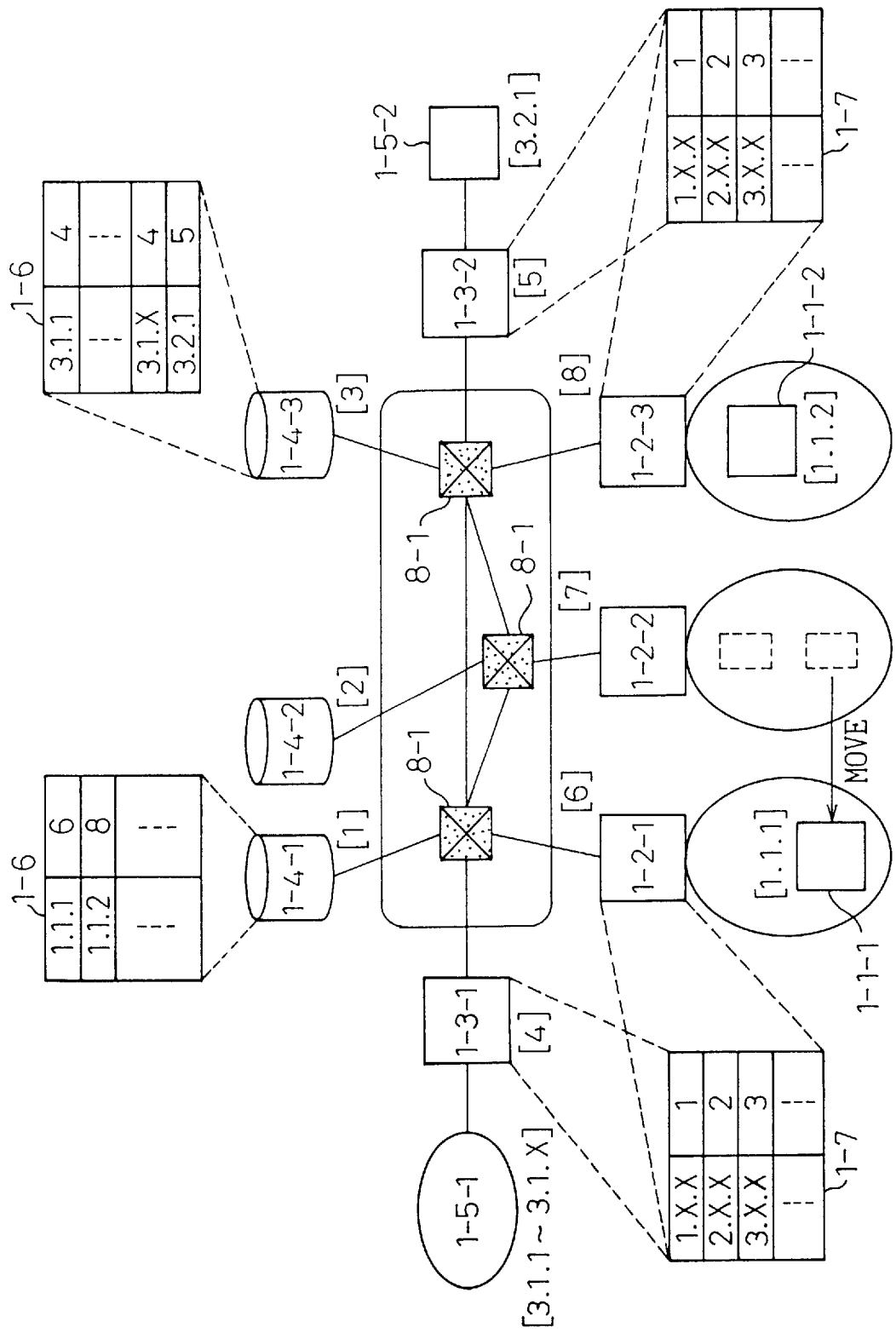
FIG. 8 is a diagram showing the configuration of an embodiment of the present invention that uses an ATM switch network.

FIG. 8 shows the configuration of an embodiment of the present invention that uses an ATM switch network as the internode network. In the configuration of this embodiment, the nodes are interconnected by mesh links of semi-permanent connections (PVC/PVC) via ATM switches 8-1. In this case, the address of each node is an ATM address, i.e., a VPI/VCI (virtual Path Identifier/Virtual Channel Identifier) address.

In the embodiment using the ATM network shown in FIG. 8, node-specific VPI/VCI addresses [1] to [8] are assigned as the addresses [ADR1] to [ADR8] of the nodes in the mobile packet communication system shown in FIG. 1.

Further, in the embodiment using the ATM network shown in FIG. 8, the location registration and packet transfer operations are performed in accordance with the same operation procedures shown in FIGS. 2 to 4, using the node-specific VPI/VCI addresses [1] to [8] as the addresses [ADR1] to [ADR8] of the respective nodes.

The following describes embodiments that respectively use AAL Type 5 and AAL Type 2 protocols as the adaptation layer when the internode network is implemented by an ATM network.

AAL Type 5 is the adaptation layer for converting a connection-oriented or connectionless data packet into ATM cells, and is a simple protocol with reduced overhead compared with AAL Type 3 or AAL Type 4.

On the other hand, AAL Type 2 is an adaptation layer protocol for transferring packets, such as a packetized video or audio signal, while maintaining timing relations between the source and destination, and has the function of disassembling variable-length packets into ATM cells and reassembling the packets by reversing the process.

Figure 9:
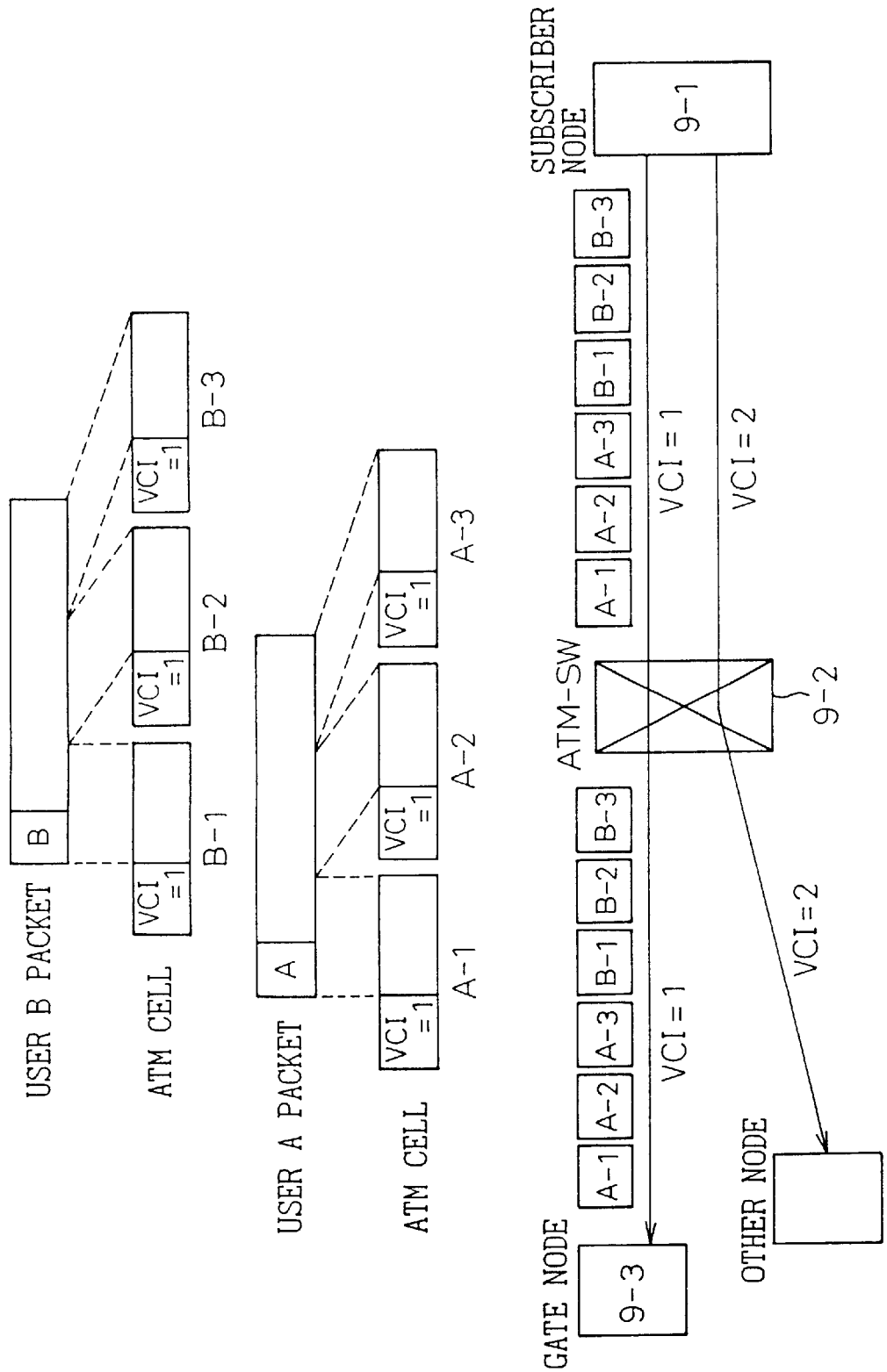
FIG. 9 is a diagram for explaining node-to-node packet transfer according to the present invention when AAL Type 5 is used in the ATM switch network.

FIG. 9 is a diagram for explaining node-to-node packet transfer according to the present invention when AAL Type 5 is used in the ATM switch network. The figure shows packets transferred from a subscriber node 9-1 to a gate node 9-3 via an ATM switch (ATM-SW) 9-2.

The subscriber node 9-1 segments a user A packet and a user B packet into ATM cells A-1 to A-3 and ATM cells B-1 to B-3, respectively, and sends out the ATM cells by appending to each ATM cell an ATM address (VCI=[1]) which is the identifier of a virtual channel to the destination gate node 9-3.

The ATM cell A-3 or B-3, containing the last data segment of the user A packet or user B packet, respectively, carries in its header a payload type designation bit indicating that it is the last segment cell.

The intermediate ATM switch (ATM-SW) 9-2 refers to the value of VCI, i.e., the ATM address, and transfers each ATM cell to the destination node. In the example of FIG. 9, the ATM cells A-1 to A-3 and ATM cells B-1 to B-3 are all transferred to the gate node 9-3.

The gate node 9-3 reconstructs the original user A packet and user B packet from the ATM cells A-1 to A-3 and ATM cells B-1 to B-3, respectively, by reversing the process that took place at the subscriber node 9-1.

In this example, since two user packets are transferred using a single virtual channel of VCI=[1], in order for the packets to be correctly reconstructed at the receiving gate node 9-3 the transmitting subscriber node 9-1 must send out the ATM cells B-1 to B-3 carrying the user B packet segments after sending out all the ATM cells A-1 to A-3 carrying the user A packet segments.

The reason for this is that the receiving gate node 9-3 cannot distinguish whether the received ATM cell is an ATM cell from the user A packet or an ATM cell from the user B packet, but can only discriminate the ATM cell containing the last data segment of either packet.

Figure 10:
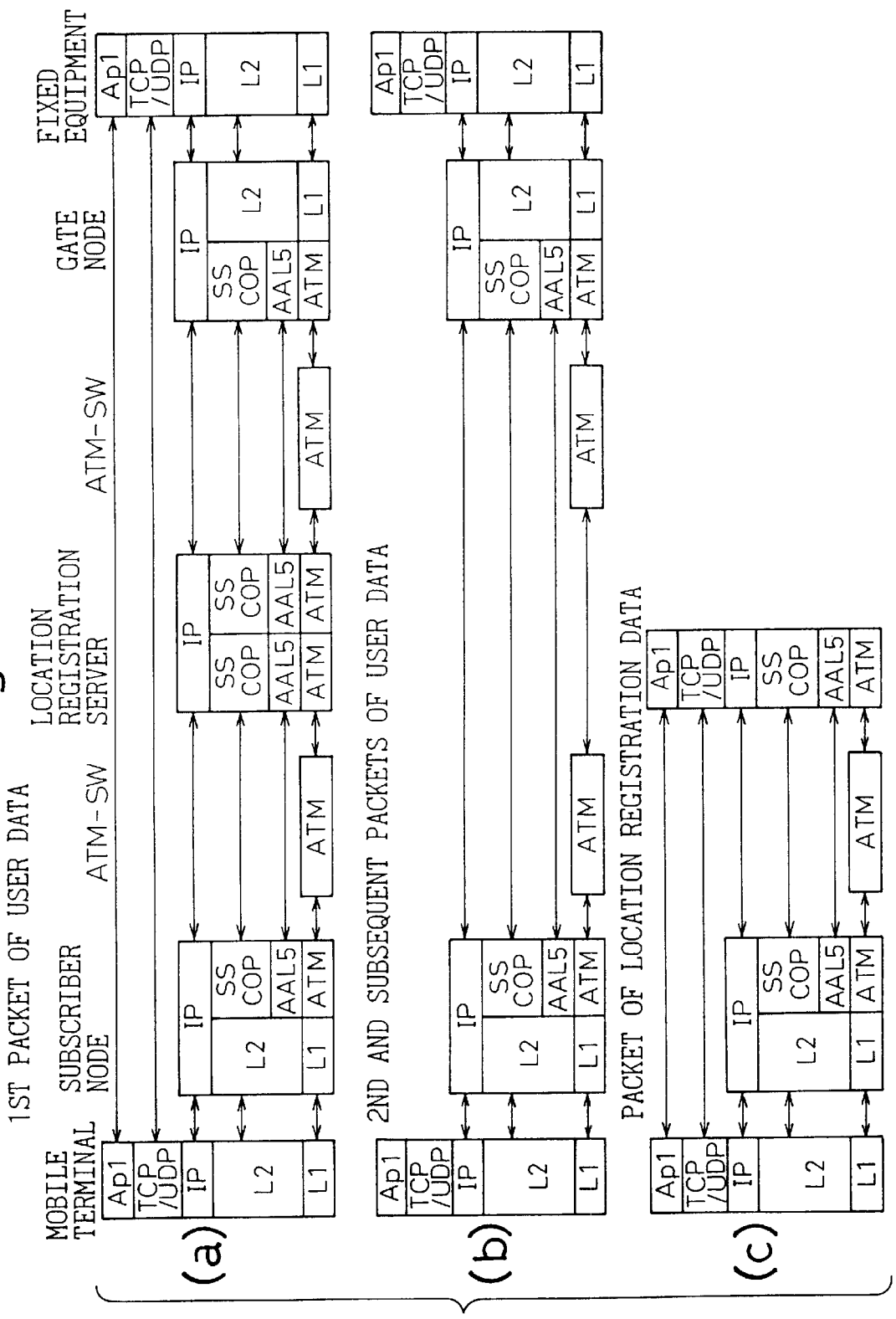
FIG. 10 is a diagram showing protocol stacks for packet transfer according to the present invention when AAL Type 5 is used in the ATM switch network.

FIG. 10 is a diagram showing protocol stacks for packet transfer according to the present invention when AAL Type 5 is used in the ATM switch network. Part (a) of the figure shows the protocol stacks for the transfer of the first user data packet, (b) the protocol stacks for the transfer of the second and subsequent user data packets, and (c) the protocol stacks for the transfer of a location registration data packet.

As shown in part (a) of the figure, the first packet is transferred via the location registration server, but the second and subsequent packets are transferred directly to the subscriber node or the gate node through the intermediate ATM switches (ATM-SWs) based on the ATM address. On the other hand, the location registration data packet is transferred to the location registration server based on the ATM address, as shown in part (c) of the figure.

The subscriber node, the gate node, and the location registration server each have the function of terminating the adaptation layer Type 5 protocol.

Figure 11:
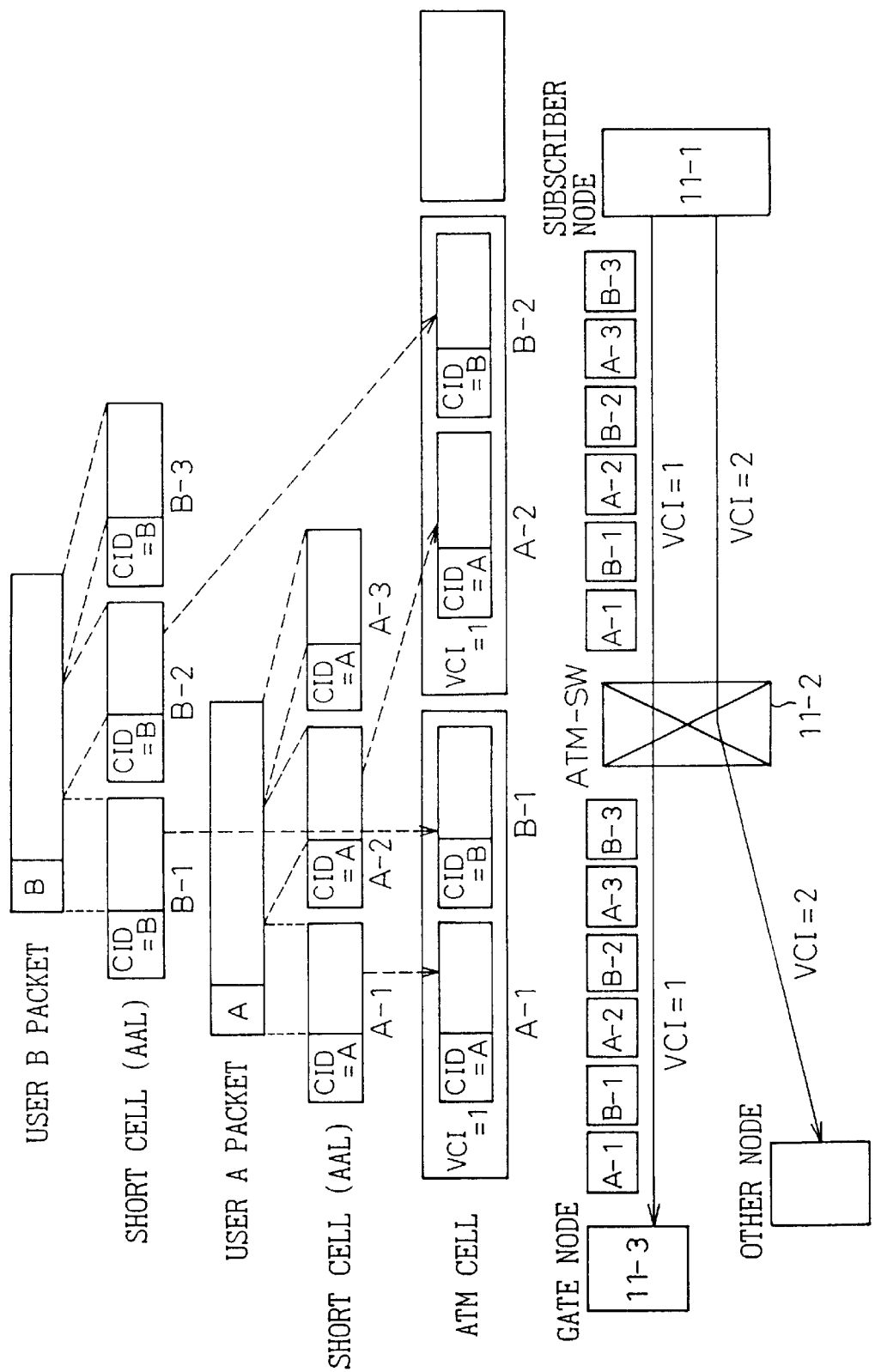
FIG. 11 is a diagram for explaining node-to-node packet transfer according to the present invention when AAL Type 2 is used in the ATM switch network.

FIG. 11 is a diagram for explaining node-to-node packet transfer according to the present invention when AAL Type 2 is used in the ATM switch network. The figure shows packets transferred from a subscriber node 11-1 to a gate node 11-3 via an ATM switch (ATM-SW) 11-2.

The subscriber node 11-1 segments a user A packet and a user B packet into variable length short cells (AAL) A-1 to A-3 and short cells (AAL) B-1 to B-3, respectively, and appends a connection identifier (CID=[A]) to each of the short cells A-1 to A-3 of the user A packet and a connection identifier (CID=[B]) to each of the short cells B-1 to B-3 of the user B packet; then, the short cells A-1 to A-3 and B-1 to B-3 destined for the same destination are multiplexed into 53-byte ATM cells for transmission by appending to each cell the ATM address (VCI=[1]) of the destination gate node 11-3.

The intermediate ATM switch (ATM-SW) 11-2 examines the value of VCI, i.e., the ATM address, and transfers each ATM cell to the destination node, as in the embodiment shown in FIG. 9.

Reversing the process that took place at the subscriber node 11-1, the gate node 11-3 identifies the user A packet and user B packet based on the connection identifiers (CIDs), and reconstructs the original user A packet and user B packet from the received ATM cells.

When the adaptation layer protocol of AAL Type 2 is used, short cells from different users can be multiplexed for transmission onto a single virtual channel (VC) by using connection identifiers (CIDs).

In this way, the individual short cells can be multiplexed in interleaving fashion, and the transfer delay due to the need to wait for the completion of ATM cells of other packet can thus be reduced compared with the packet transfer using AAL Type 5 shown in FIG. 9.

Figure 12:
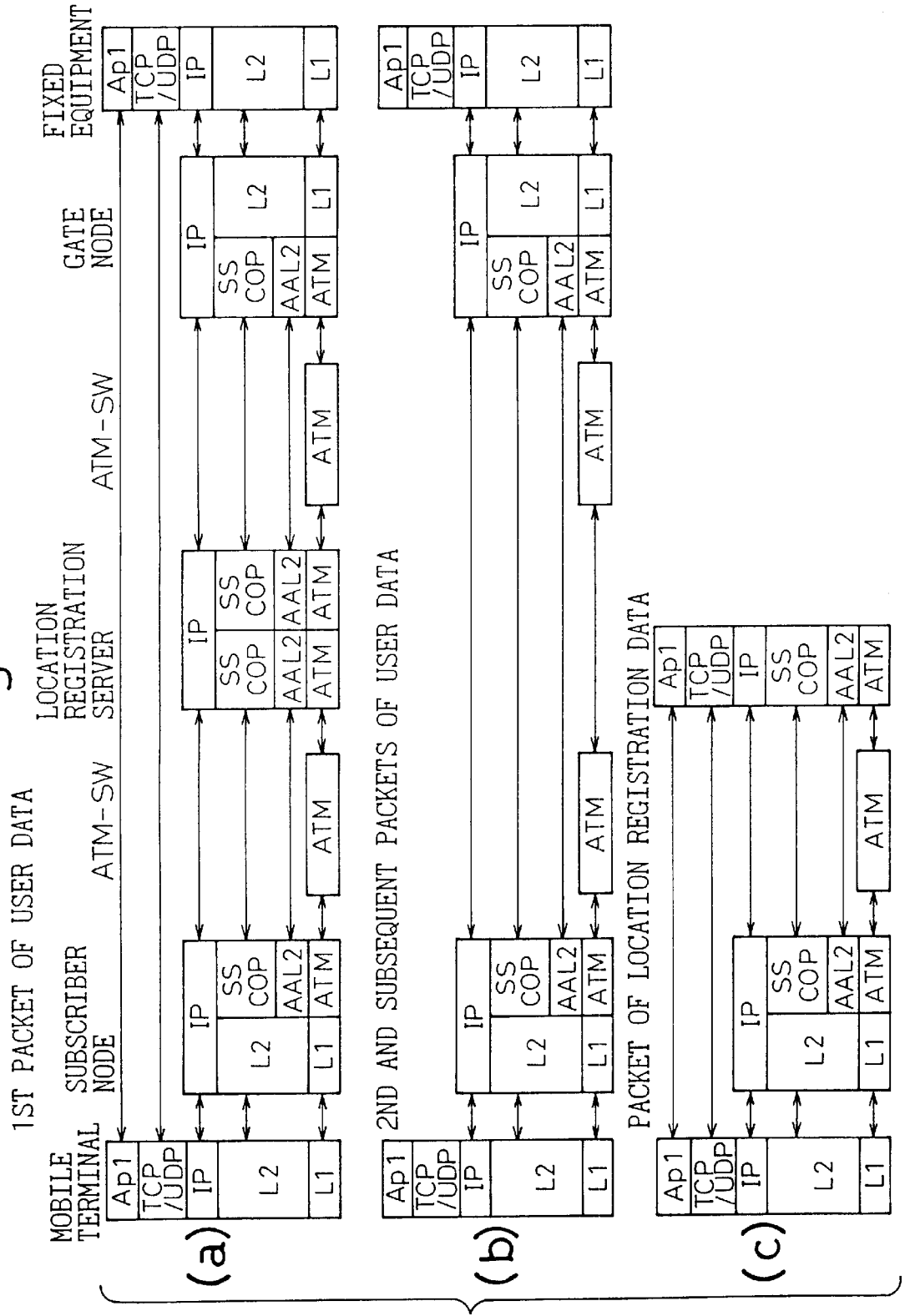
FIG. 12 is a diagram showing protocol stacks for packet transfer according to the present invention when AAL Type 2 is used in the ATM switch network.

FIG. 12 is a diagram showing protocol stacks for packet transfer according to the present invention when AAL Type 2 is used in the ATM switch network. Part (a) of the figure shows the protocol stacks for the transfer of the first user data packet, (b) the protocol stacks for the transfer of the second and subsequent user data packets, and (c) the protocol stacks for the transfer of a location registration data packet.

The protocol stacks shown in FIG. 12 are the same as those in the embodiment of FIG. 10, except that adaptation layer AAL Type 5 is replaced by adaptation layer AAL Type 2.

Figure 13:
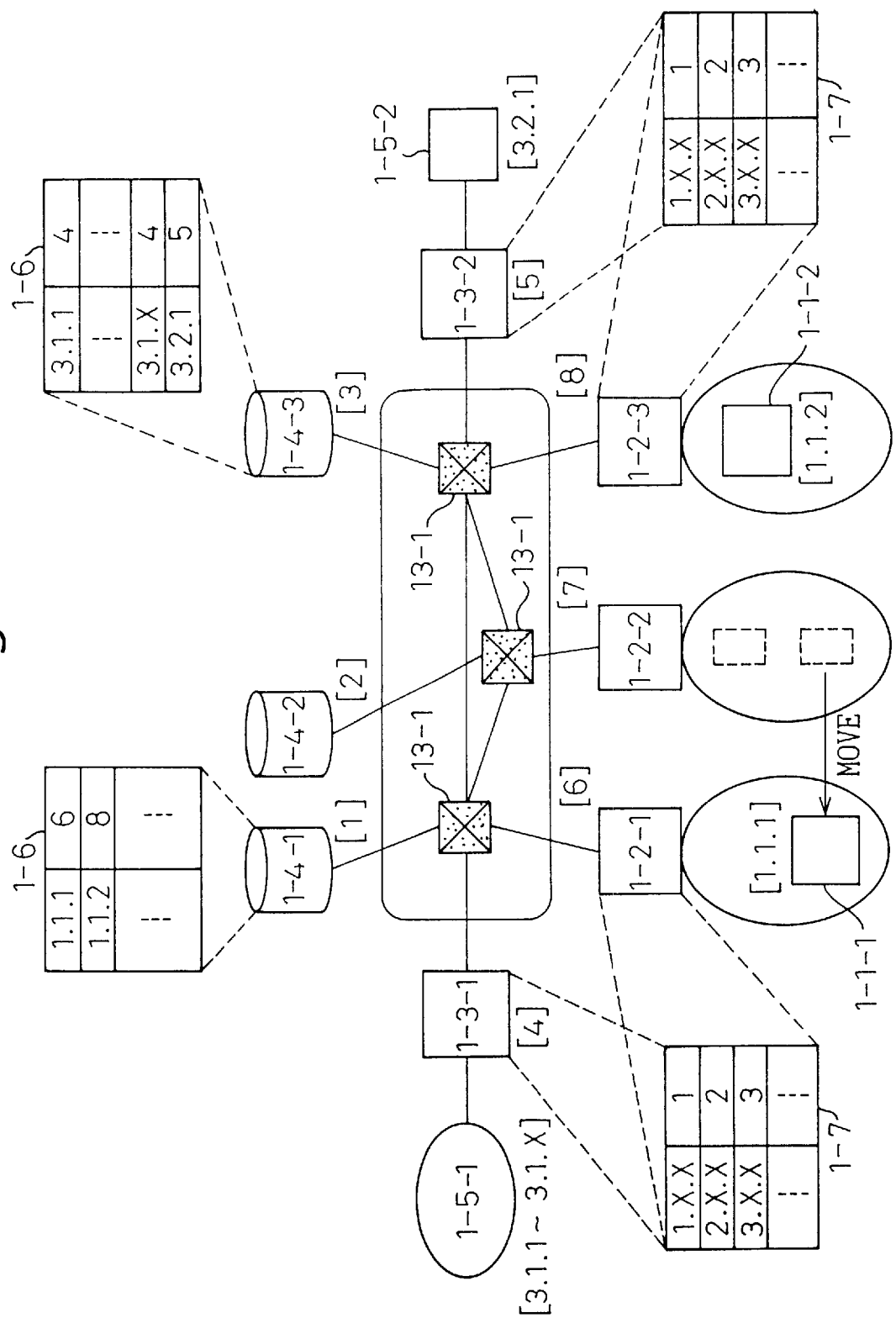
FIG. 13 is a diagram showing the configuration of an embodiment of the present invention that uses an AAL switch network.

FIG. 13 is a diagram showing the configuration of an embodiment of the present invention that uses an AAL switch network as the internode network. In this embodiment, adaptation layer switches (AAL-SWs) 13-1 for switching cells of adaptation layer AAL Type 2 are provided within the internode network, and the nodes are interconnected by mesh links at the AAL Type 2 level.

In this embodiment, each node transfers cells using adaptation layer AAL Type 2. In this case, the address of each node is an adaptation layer AAL Type 2 address, that is, a VPI/VCI/CID (Virtual Path Identifier/Virtual Channel Identifier/Connection Identifier) address.

The embodiment shown in FIG. 13 differs from the embodiment shown in FIG. 8 in that the ATM switches (ATM-SWs) 8-1 are replaced by the adaptation layer switches (AAL-SWS) 13-1, and in that node-specific VPI/VCI/CID addresses [1] to [8] are assigned as the addresses [ADR1] to [ADR8] of the nodes in the mobile packet communication system.

Figure 14:
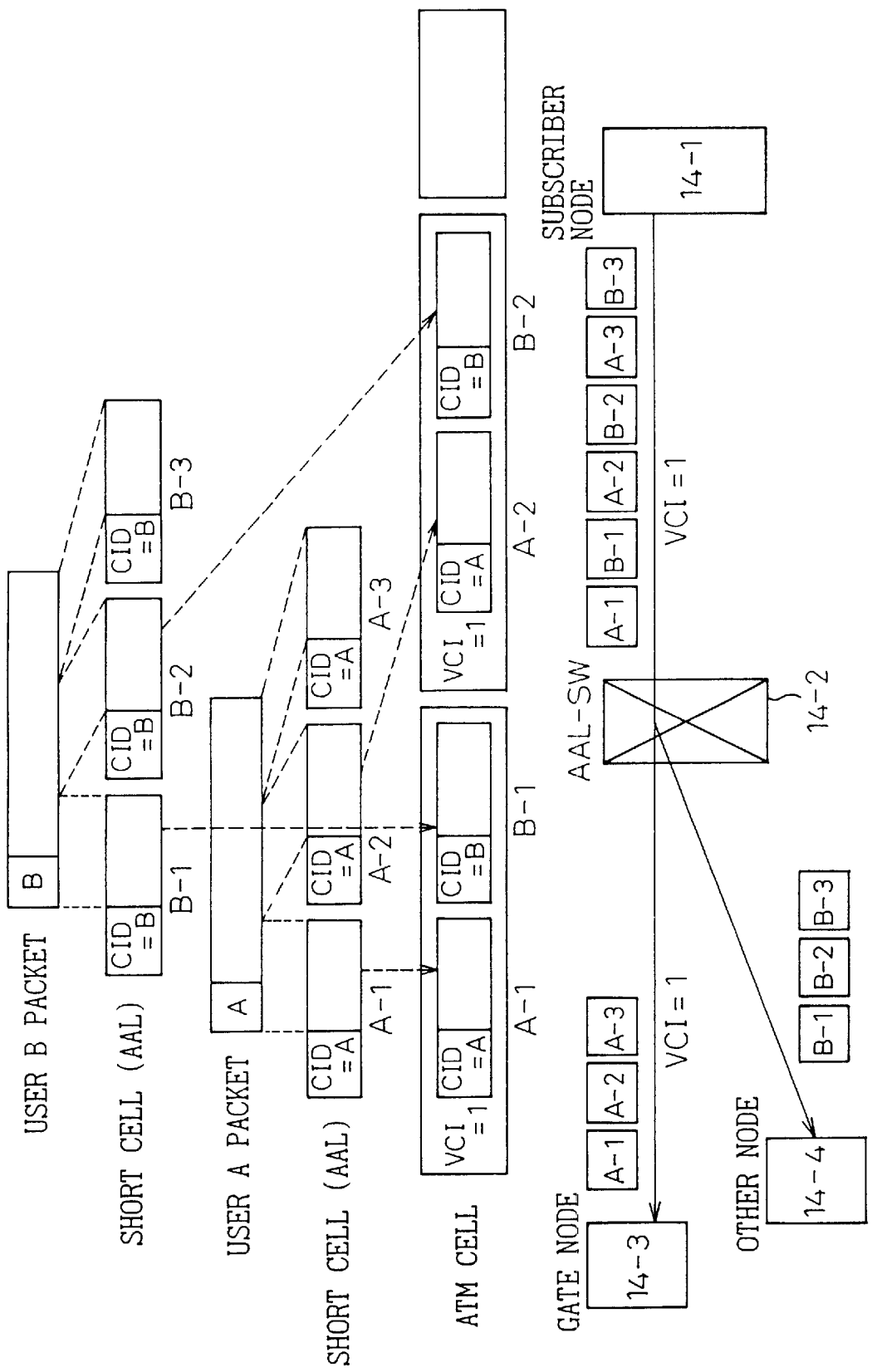
FIG. 14 is a diagram for explaining packet transfer according to the present invention when AAL Type 2 is used in the AAL switch network.

FIG. 14 is a diagram for explaining packet transfer according to the present invention when AAL Type 2 is used in the AAL switch network. The figure shows packets transferred from a subscriber node 14-1 to gate nodes 14-3 and 14-4 via an adaptation layer switch (AAL-SW) 14-2.

The subscriber node 14-1 segments a user A packet and a user B packet into variable length short cells (AAL) A-1 to A-3 and B-1 to B-3, respectively, and appends a connection identifier (CID=[A]) to each of the short cells A-1 to A-3 of the user A packet and a connection identifier (CID=[B]) to each of the short cells B-1 to B-3 of the user B packet, as in the embodiment shown in FIG. 11; then, the short cells A-1 to A-3 and B-1 to B-3 destined for the same adaptation layer switch.(AAL-SW) 14-2 are multiplexed into 53-byte ATM cells for transmission by appending to each cell the VCI=[1] of the adaptation layer switch (AAL-SW) as the ATM address.

The intermediate adaptation layer switch (AAL-SW) 14-2 refers to the values of the virtual channel identifier (VCI) and connection identifier (CID) that form the ATM address, and transfers each short cell to the destination node.

In the example shown in FIG. 14, the short cells with CID=[A], i.e., the user A packets, are transferred to the gate node 14-3, while the short cells with CID=[B], i.e., the user B packets, are transferred to another node 14-4.

The gate nodes 14-3 and 14-4 reconstruct the original packets A and B from the received short cells A-1 to A-3 and B-1 to B-3, respectively, by reversing the process that took place at the subscriber node 14-1.

When AAL Type 2 is used in the AAL network shown in FIG. 14, the connection identifier (CID) serves as the destination address, and though the waiting delay time cannot be shortened compared with the embodiment shown in FIG. 11, the address region at each node increases by an amount equal to the connection identifier CID; therefore, the configuration can be applied to a larger network.

Figure 15:
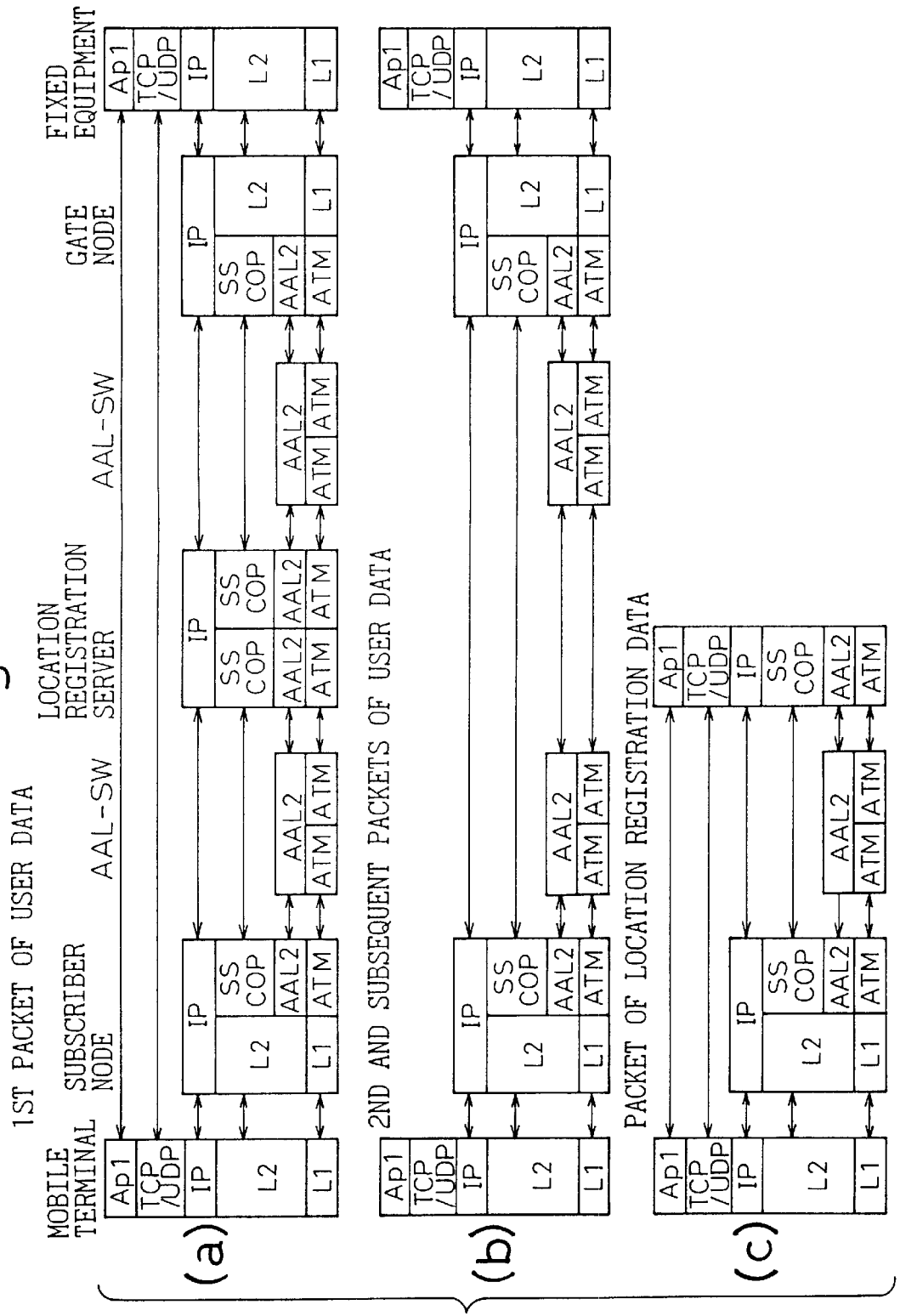
FIG. 15 is a diagram showing protocol stacks for packet transfer according to the present invention when AAL Type 2 is used in the AAL switch network.

FIG. 15 is a diagram showing protocol stacks for packet transfer according to the present invention when AAL Type 2 is used in the AAL switch network. Part (a) of the figure shows the protocol stacks for the transfer of the first user data packet, (b) the protocol stacks for the transfer of the second and subsequent user data packets, and (c) the protocol stacks for the transfer of a location registration data packet.

The protocol stacks shown in FIG. 15 are the same as those in the embodiment of FIG. 12, except that the ATM switch is replaced by an adaptation layer switch (AAL-SW) that has the function of terminating adaptation layer AAL Type 2.

Figure 16:
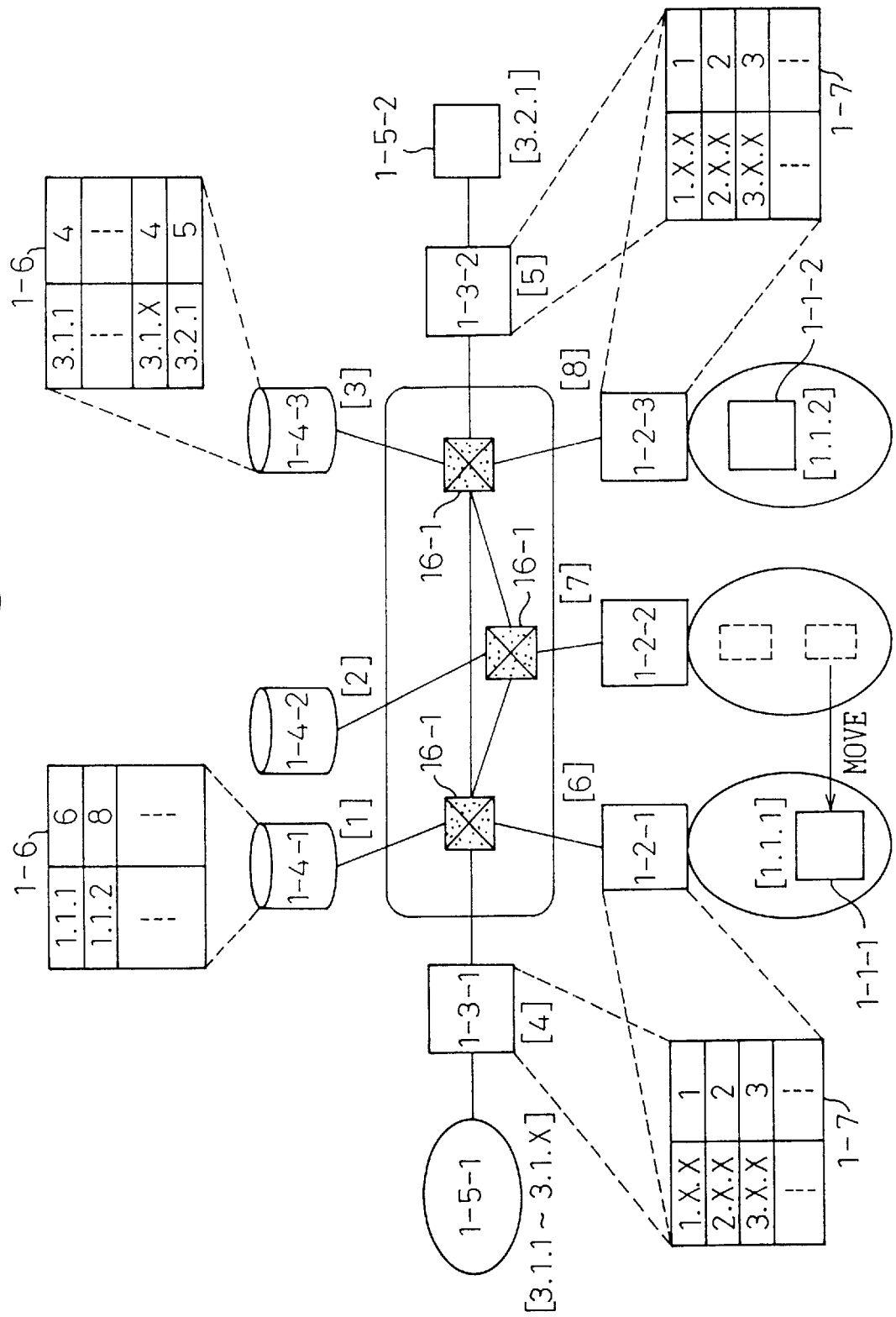
FIG. 16 is a diagram showing the configuration of an embodiment of the present invention that uses an ATM connectionless network.

FIG. 16 is a diagram showing the configuration of an embodiment of the present invention that uses an ATM connectionless network as the internode network. In this embodiment, ATM connectionless servers 16-1 are provided within the internode network, and the nodes are interconnected by mesh links at the ATM connectionless address level.

In this case, the address of each node is an ATM connectionless address. An address as defined, for example, by E. 164 or IPv6 can be used as the ATM connectionless address of each node.

The embodiment shown in FIG. 16 is implemented by assigning node-specific ATM connectionless addresses [1] to [8] as the addresses [ADR1] to [ADR8] of the nodes in the mobile packet communication system of the invention shown in FIG. 1.

In the embodiment shown in FIG. 16, the location registration and packet transfer operations are performed in accordance with the same operation procedures shown in FIGS. 2 to 4, using the node-specific ATM connectionless addresses [1] to [8] as the addresses [ADR1] to [ADR8] of the respective nodes.

Figure 17:
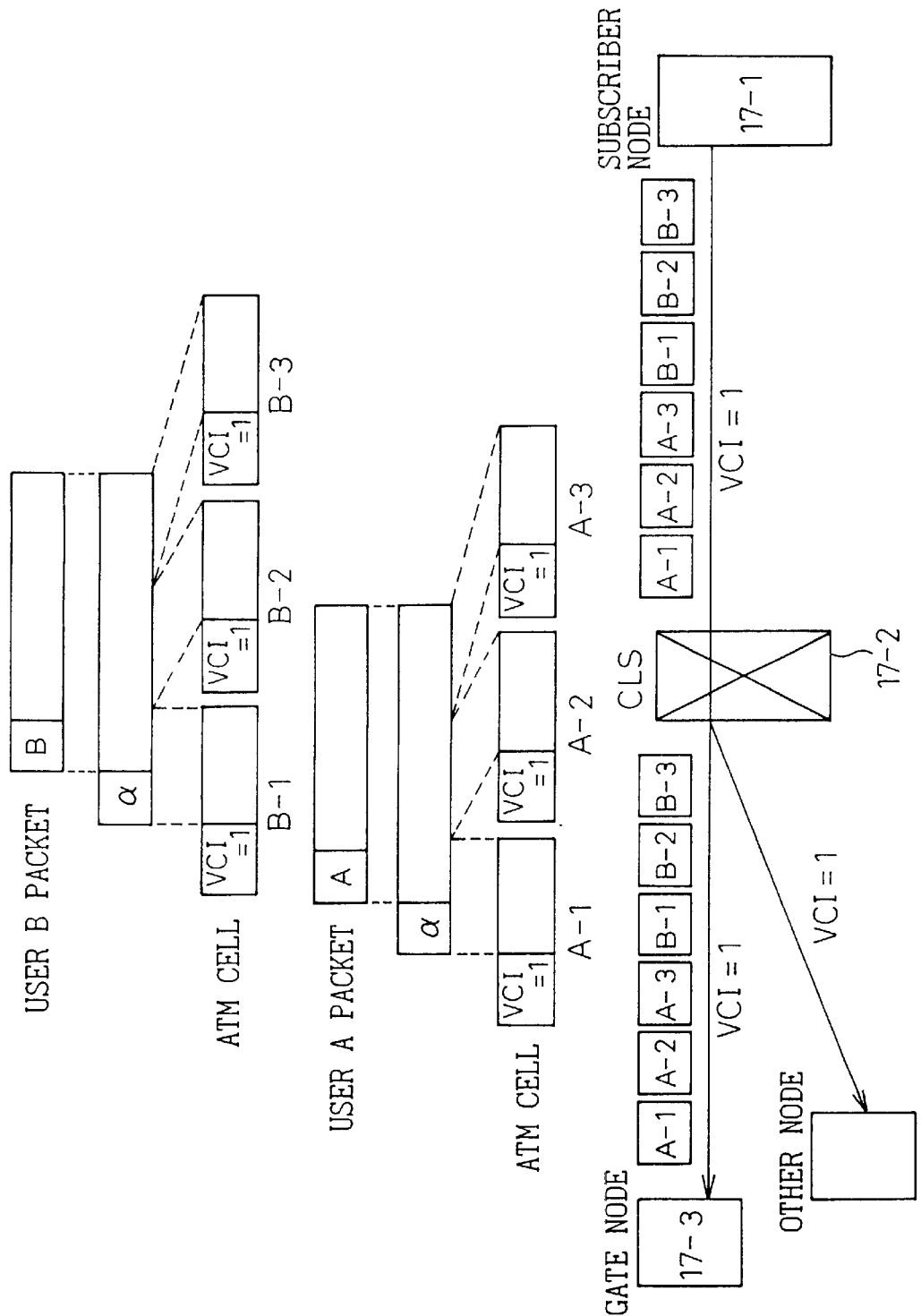
FIG. 17 is a diagram for explaining packet transfer according to the present invention using the ATM connectionless network.

FIG. 17 is a diagram for explaining packet transfer according to the present invention using the ATM connectionless network. The figure shows packets transferred from a subscriber node 17-1 to a gate node 17-3 via an ATM connectionless server (CLS) 17-2 in accordance with adaptation layer AAL Type 5.

The subscriber node 17-1 appends the IP address [ ] of the destination gate node 17-3 to the user A packet and user B packet, segments each packet into ATM cells, and sends out the ATM cells by appending the ATM address VCI=[1] of the destination gate node to each cell.

The intermediate ATM connectionless server (CLS) 17-2 refers to the connectionless address value [ ] and transfers each subsequent ATM cell to the destination node. In the illustrated example, ATM cells from both the user A packet and user B packet are transferred to the gate node 17-3.

The gate node 17-3 reconstructs the original user A packet and user B packet from the received ATM cells by reversing the process that took place at the subscriber node 17-1.

In the embodiment shown in FIG. 17, though the waiting delay time cannot be shortened compared with the embodiment of FIG. 11 that uses AAL Type 2 in the ATM switch network, the address region at each node increases by an amount equal to the connection address; therefore, the configuration can be applied to a larger network.

Figure 18:
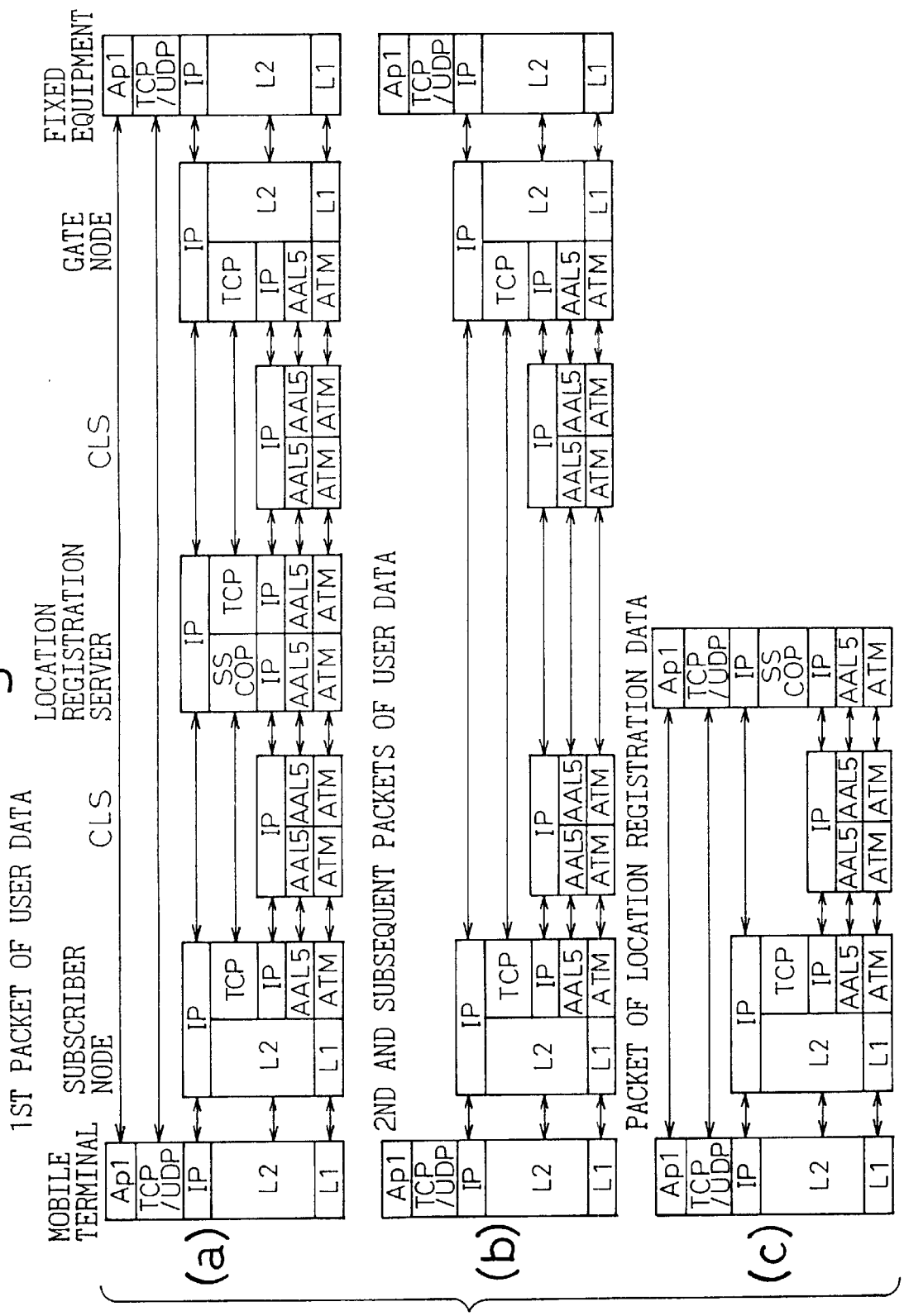
FIG. 18 is a diagram showing protocol stacks for packet transfer according to the present invention using the ATM connectionless network.

FIG. 18 is a diagram showing protocol stacks for packet transfer according to the present invention using the ATM connectionless network. Part (a) of the figure shows the protocol stacks for the transfer of the first user data packet, (b) the protocol stacks for the transfer of the second and subsequent user data packets, and (c) the protocol stacks for the transfer of a location registration data packet.

In the protocol stacks shown in FIG. 18, SSCOP (Service Specific Connection Oriented Protocol) at layer 2 in the subscriber node, location registration server, and gate node in the foregoing embodiments is replaced by TCP and IP, and the ATM connectionless server (CLS) is provided with the function of terminating adaptation layer AAL 5 and IP protocols.

Figure 19:
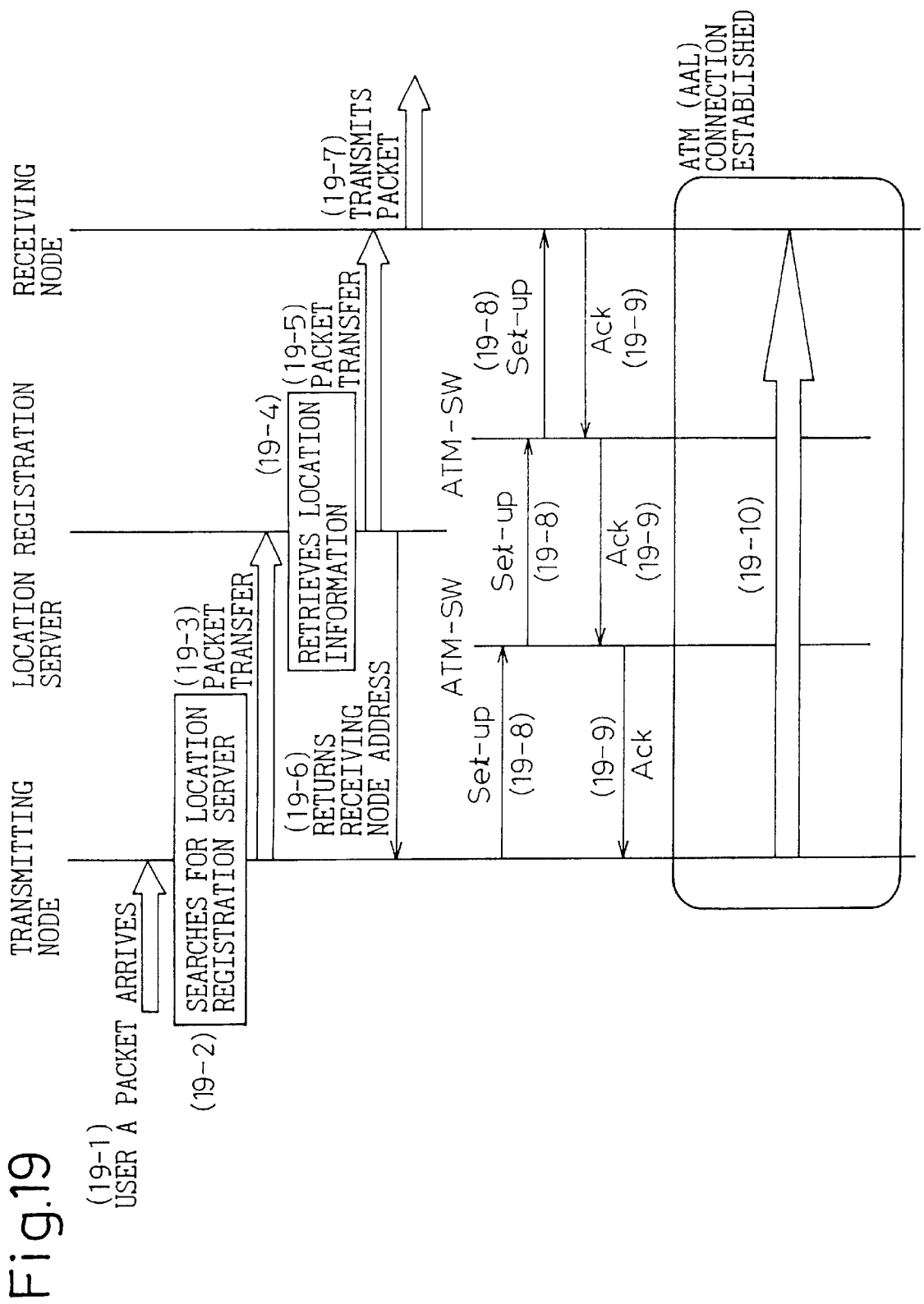
FIG. 19 is a sequence diagram when an SVC as employed in an ATM network is used for a direct connection between nodes according to the present invention.
Figure 20:
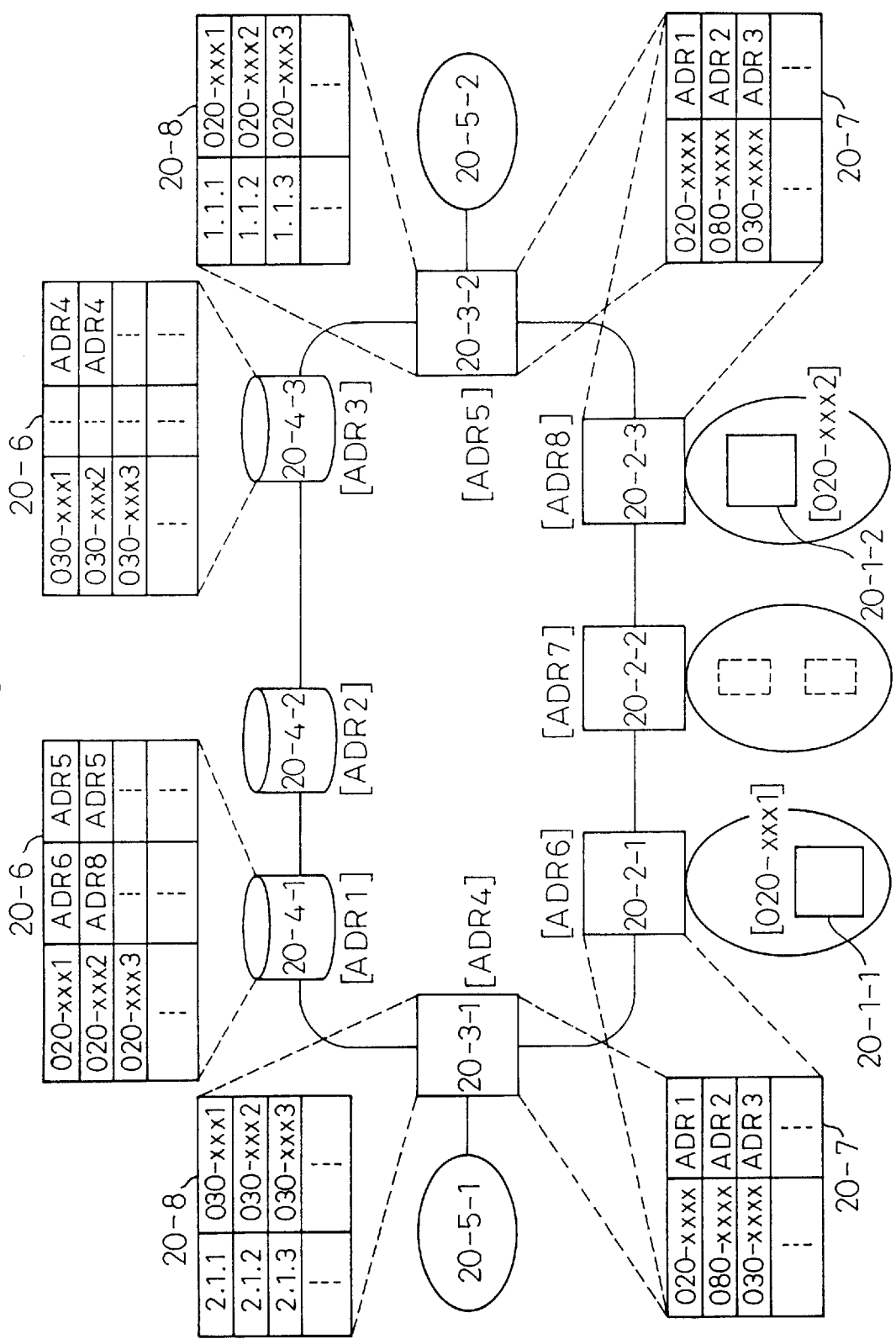
FIG. 20 is a diagram showing the configuration of a prior art mobile packet communication system in a cellular communication network.
Figure 21:
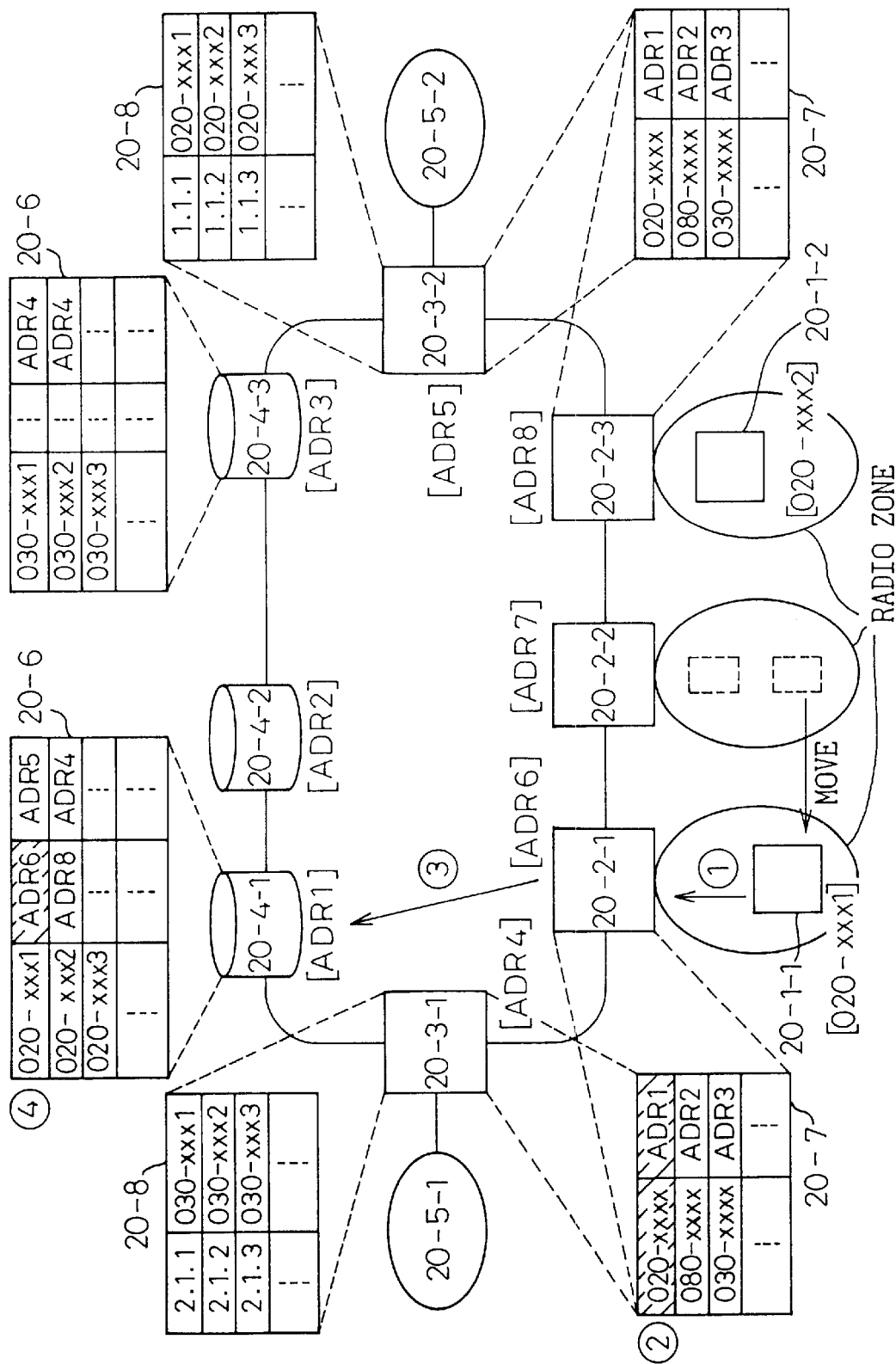
FIG. 21 is a diagram for explaining the location registration operation for a moving mobile terminal in the prior art mobile packet communication system.
Figure 22:
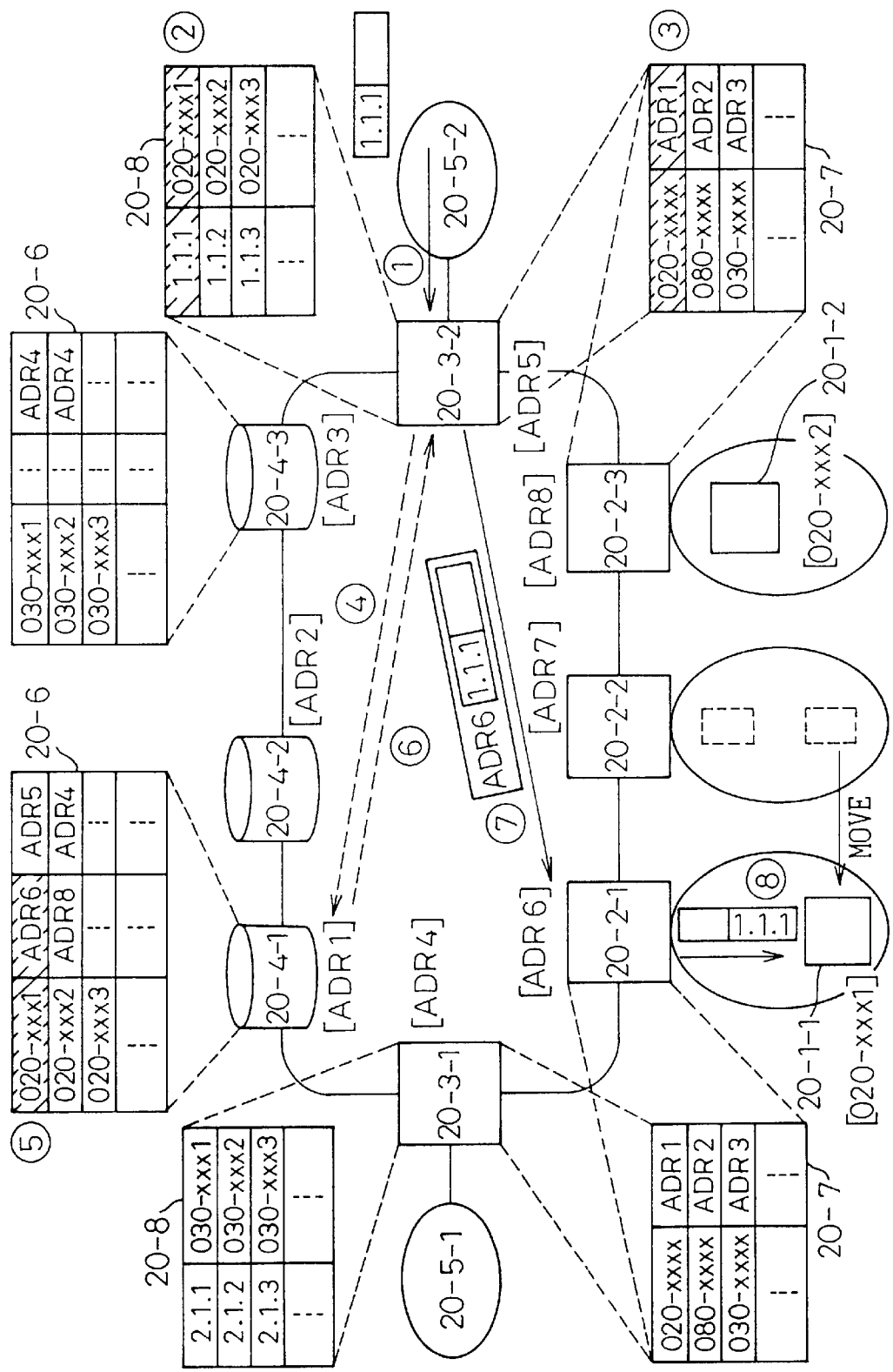
FIG. 22 is a diagram for explaining the operation for packet transfer from fixed equipment to a mobile terminal according to the prior art.
Figure 23:
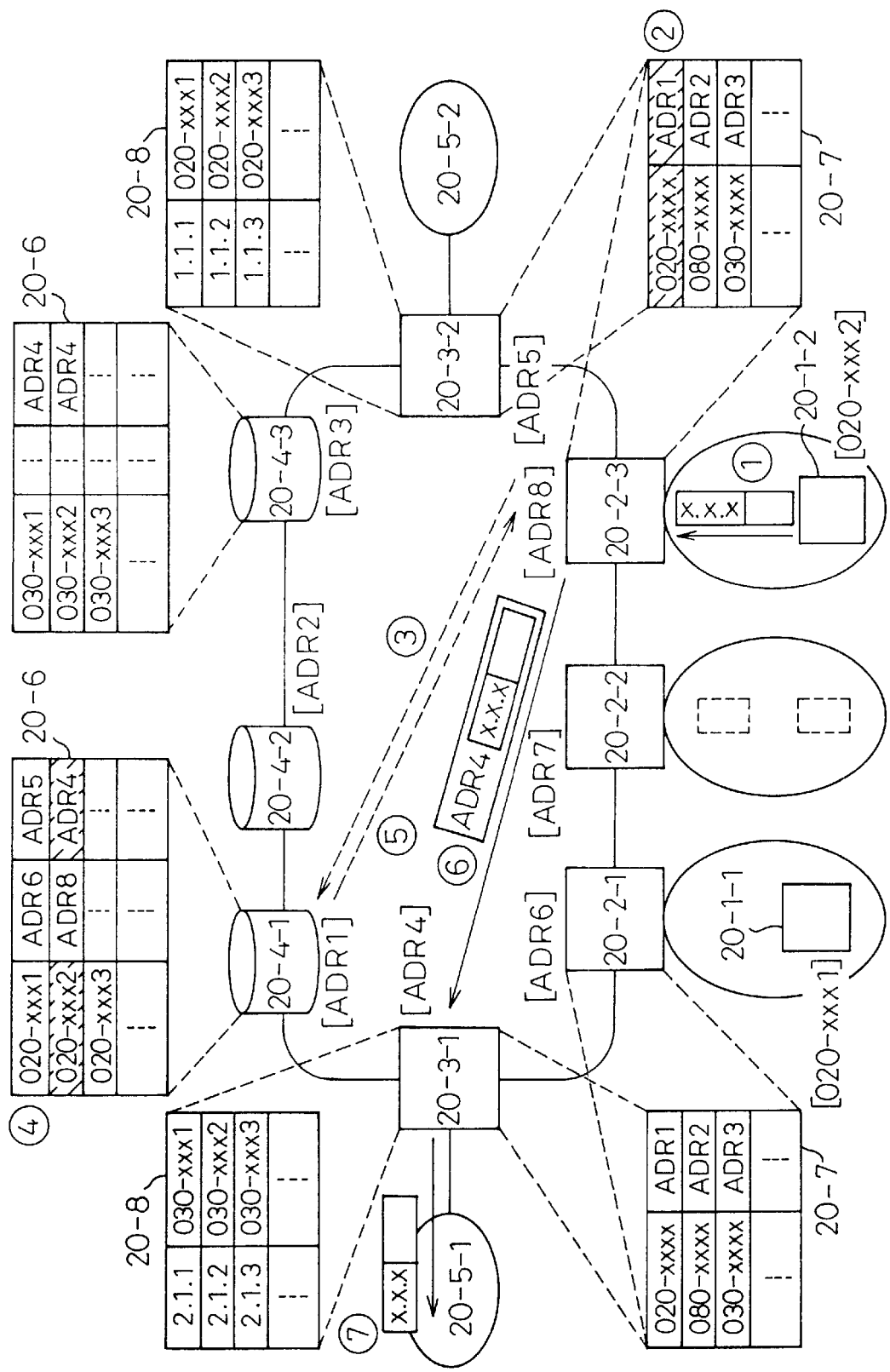
FIG. 23 is a diagram for explaining the operation for packet transfer from a mobile terminal to fixed equipment according to the prior art.
Figure 24:
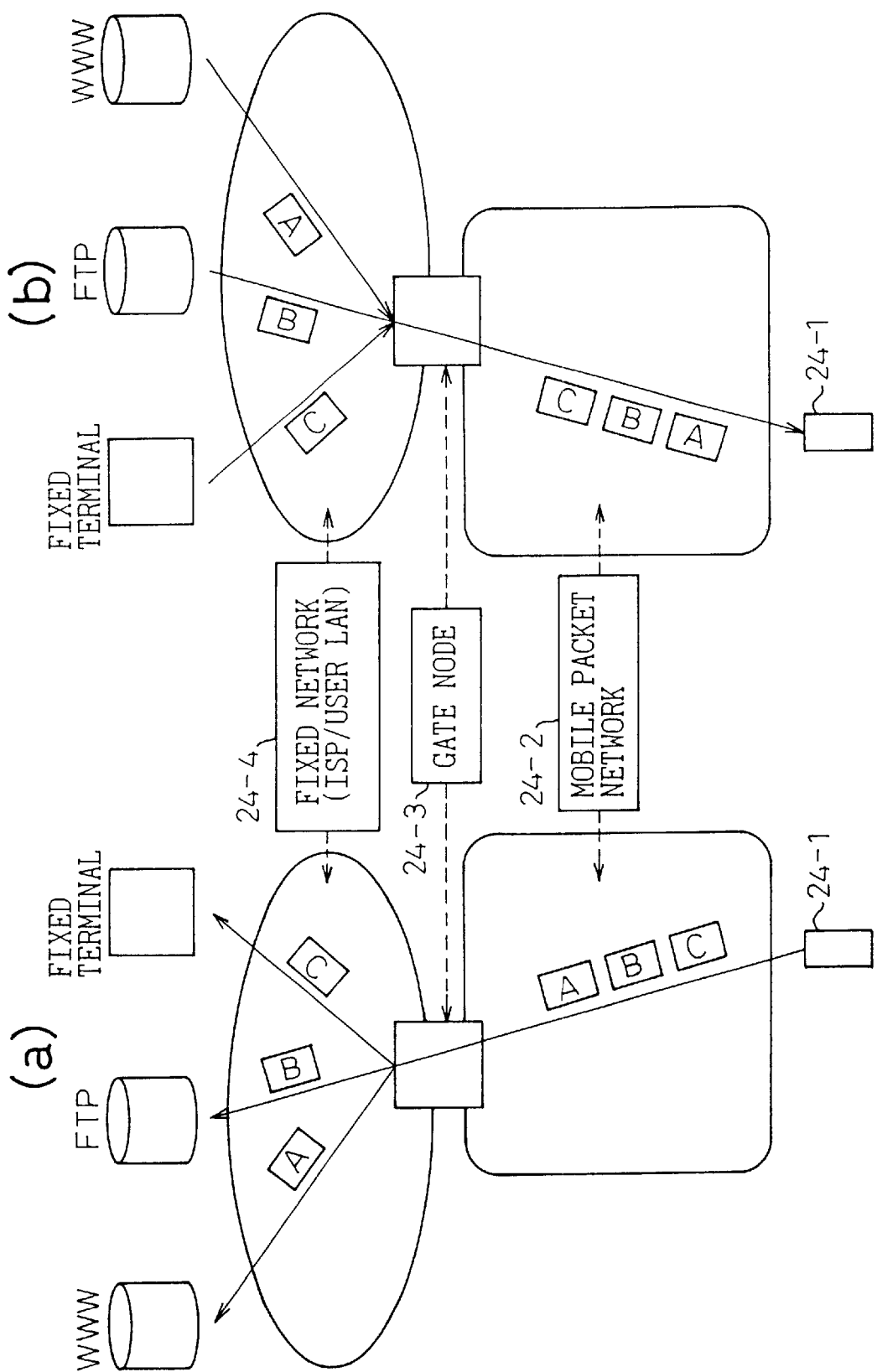
FIG. 24 is a diagram for explaining communication routes between the prior art mobile packet system and fixed equipment.

FIG. 19 is a sequence diagram when an SVC as employed in an ATM network is used for a direct connection between nodes according to the present invention.

When a user A packet arrives (19-1), the transmitting node searches for the location registration server (19-2), and transfers the packet to that location registration server (19-3).

The location registration server retrieves location information (19-4), and transfers the packet to the receiving node (19-5), while at the same time, returning the receiving node address to the transmitting node (19-6). In the meantime, the receiving node transmits the first packet received from the location registration server on to the designated destination (19-7).

Upon receiving the receiving node address, the transmitting node sets up a connection to the receiving node via ATM switches (ATM-SWs) (19-8), in response to which the receiving node returns an acknowledgement (Ack) (19-9), and the connection is thus established.

Subsequent packets are transferred along the connection thus established from the transmitting node to the receiving node (19-10).

In the embodiments shown in FIGS. 15 to 18, since the node-to-node connection is shared by a plurality of users, it is difficult to provide specific QoS (Quality of Service) for each individual user.

On the other hand, when an individual connection is set up for each user by using the procedure shown in FIG. 19 for setting up an SVC (Switched Virtual Connection) in an ATM network, it becomes possible to satisfy QoS for each individual user.

The switched virtual connection SVC can be set up at the virtual channel (VC) level by using adaptation layer AAL Type 5, or if bandwidth guarantee is needed, at the adaptation layer (AAL) level by using adaptation layer AAL Type 2.

As described above, according to the present invention, the location registration server stores, for each mobile terminal assigned a packet address, the address of the subscriber node currently serving the mobile terminal, and the transmitting node temporarily stores the receiving node address reported from the location registration server, and transfers subsequent packets directly to the receiving node by using the temporarily stored receiving node address. In this way, the optimum route for packet transfer is selected, and the packet transfer between the mobile terminal and fixed equipment can be integrated on a common platform.

What is claimed is:

1. A mobile packet communication system comprising mobile terminals connected via a mobile radio communication network, subscriber nodes accommodating said mobile terminals, gate nodes connected to fixed equipment including Internet service providers or local area networks, and a plurality of location registration servers, one for each group of destination packet addresses having the same high-order digits, wherein said subscriber nodes, said gate nodes, and said location registration servers are interconnected by a network, and wherein:

said subscriber nodes, said gate nodes, and said location registration servers are each assigned a unique address for routing;

said location registration servers each include a register which stores, for each mobile terminal assigned a packet address containing the high-order digit of packet destination address associated with said each location registration server, the address of the subscriber node currently serving said each mobile terminal, or stores, for each fixed equipment assigned a packet address containing said high-order digit, the address of the gate node to which said each fixed equipment is connected;

said subscriber nodes and said gate nodes each include a table used to retrieve the address of the corresponding location registration server by reference to the high-order digit of the packet destination address;

a transmitting node, which is a subscriber node that received a packet from a particular mobile terminal or a gate node that received a packet from particular fixed equipment, includes means for retrieving the address of the corresponding location registration server by reference to the high-order digit of the destination address contained in said packet, and for transferring said received packet to said location registration server;

said location registration server includes means for retrieving, by reference to the destination address contained in said received packet, the address of the mobile terminal corresponding to said destination address or the address of a receiving gate node connected to the fixed equipment corresponding to said destination address, and for returning the retrieved receiving node address to said transmitting node; and said transmitting node includes means for temporarily storing said receiving node address returned from said location registration server, and for transferring any subsequent packet having the same destination address and received from said mobile terminal or said fixed equipment, directly to said receiving node by using said temporarily stored receiving node address.

2. A mobile packet communication system as claimed in claim 1, wherein said location registration server includes means for transferring the packet received from said transmitting node on to said receiving node, and said transmitting node includes means for transferring directly to said receiving node any n-th packet (n≧=2) having the same destination address and received from said mobile terminal or said fixed equipment subsequently to the reception of said receiving node address from said location registration server.

3. A mobile packet communication system as claimed in claim 1, wherein said subscriber nodes, said gate nodes, and said location registration servers are each assigned a unique Internet address for routing, and said network interconnecting said subscriber nodes, said gate nodes, and said location registration servers is constructed from a router network.

4. A mobile packet communication system as claimed in claim 1, wherein said subscriber nodes, said gate nodes, and said location registration servers are each assigned a unique ATM address for routing, and said network interconnecting said subscriber nodes, said gate nodes, and said location registration servers is constructed using semi-permanent connections on an ATM network, and wherein said subscriber nodes, said gate nodes, and said location registration servers each include means for transferring said packet by using adaptation layer AAL Type 5 protocol.

5. A mobile packet communication system as claimed in claim 1, wherein said subscriber nodes, said gate nodes, and said location registration servers are each assigned a unique ATM address for routing, and said network interconnecting said subscriber nodes, said gate nodes, and said location registration servers is constructed using semi-permanent connections on an ATM network, and wherein said subscriber nodes, said gate nodes, and said location registration servers each include means for transferring said packet by using adaptation layer AAL Type 2 protocol.

6. A mobile packet communication system as claimed in claim 1, wherein said subscriber nodes, said gate nodes, and said location registration servers are each assigned a unique address of adaptation layer AAL Type 2 for routing, and said network interconnecting said subscriber nodes, said gate nodes, and said location registration servers is constructed using semi-permanent connections of adaptation layer AAL Type 2 on an ATM network, and wherein said subscriber nodes, said gate nodes, and said location registration servers each include means for transferring said packet by using adaptation layer AAL Type 2 protocol.

7. A mobile packet communication system as claimed in claim 1, wherein said subscriber nodes, said gate nodes, and said location registration servers are each assigned a unique ATM connectionless address for routing, and said network interconnecting said subscriber nodes, said gate nodes, and said location registration servers is constructed from an ATM connectionless network, and wherein said subscriber nodes, said gate nodes, and said location registration servers each include means for transferring said packet by using adaptation layer AAL Type 5 protocol or adaptation layer AAL Type 2 protocol.

8. A mobile packet communication system as claimed in claim 1, wherein said subscriber nodes, said gate nodes, and said location registration servers are interconnected by switched virtual connections (SVCs) on an ATM network.

\* \* \* \* \*